(12) United States Patent
Kasazumi et al.

(10) Patent No.: US 8,016,427 B2
(45) Date of Patent: Sep. 13, 2011

(54) LIGHT SOURCE DEVICE, AND TWO-DIMENSIONAL IMAGE DISPLAY DEVICE

(75) Inventors: Ken'ichi Kasazumi, Osaka (JP); Kiminori Mizuuchi, Osaka (JP); Akihiro Morikawa, Osaka (JP); Kazuhisa Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/645,204

(22) Filed: Dec. 22, 2009

(65) Prior Publication Data

US 2010/0097674 A1    Apr. 22, 2010

Related U.S. Application Data

(62) Division of application No. 10/588,107, filed as application No. PCT/JP2005/000975 on Jan. 26, 2005, now abandoned.

(30) Foreign Application Priority Data

Jan. 29, 2004  (JP) .................................. 2004-021639

(51) Int. Cl.
    *G03B 21/00*    (2006.01)
(52) U.S. Cl. ............................ 353/31; 348/742; 359/566
(58) Field of Classification Search .................. 359/15, 359/566; 353/31; 348/742, 761, 766, 790; 369/103, 112.03, 112.05, 112.06, 112.07, 369/112.1, 112.12, 112.04
    See application file for complete search history.

(56) References Cited

U.S. PATENT DOCUMENTS

| | | | |
|---|---|---|---|
| 6,130,872 A | 10/2000 | Sugiura et al. | 369/112.04 |
| 6,185,016 B1 | 2/2001 | Popovich | 359/15 |
| 6,799,849 B2 | 10/2004 | Kim et al. | 353/30 |
| 6,928,035 B2 | 8/2005 | Komma et al. | 369/44.37 |
| 7,001,022 B2 | 2/2006 | Kim et al. | 353/31 |
| 7,099,085 B2 | 8/2006 | Yamada et al. | 359/569 |
| 2003/0189742 A1 | 10/2003 | Kobayashi | 359/202 |
| 2005/0248820 A1* | 11/2005 | Moser et al. | 359/15 |

FOREIGN PATENT DOCUMENTS

| | | |
|---|---|---|
| EP | 0 985 952 | 3/2000 |
| JP | 10-293268 | 11/1998 |
| JP | 11-64789 | 3/1999 |
| JP | 2000-242192 | 9/2000 |
| JP | 2000-321435 | 11/2000 |
| JP | 2002-56706 | 2/2002 |
| JP | 2002-202414 | 7/2002 |
| JP | 2003-90959 | 3/2003 |
| JP | 2003-270585 | 9/2003 |
| JP | 2003-330109 | 11/2003 |

\* cited by examiner

*Primary Examiner* — Alessandro Amari
(74) *Attorney, Agent, or Firm* — Steptoe & Johnson LLP

(57) ABSTRACT

There is provided a light source device which can miniaturize a two-dimensional image display device as small as possible. The light source device is provided with three coherent light sources (11a), (11b), and (11c) corresponding to red, blue, and green; prisms (12a) and (12c) for reflecting lights emitted from the coherent light sources (11a) and (11c); and a diffraction part (20) comprising a single volume hologram on which plural gratings are multiply-formed, which gratings diffract the light emitted from the coherent light source (11b), and the lights that are emitted from the coherent light sources (11a) and (11c) and reflected by the prisms (12a) and (12b) so that these lights propagate in the same optical path.

8 Claims, 14 Drawing Sheets

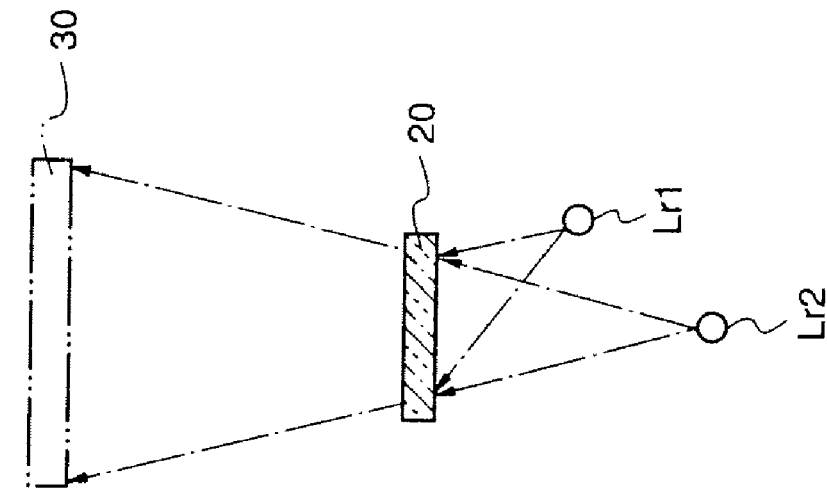
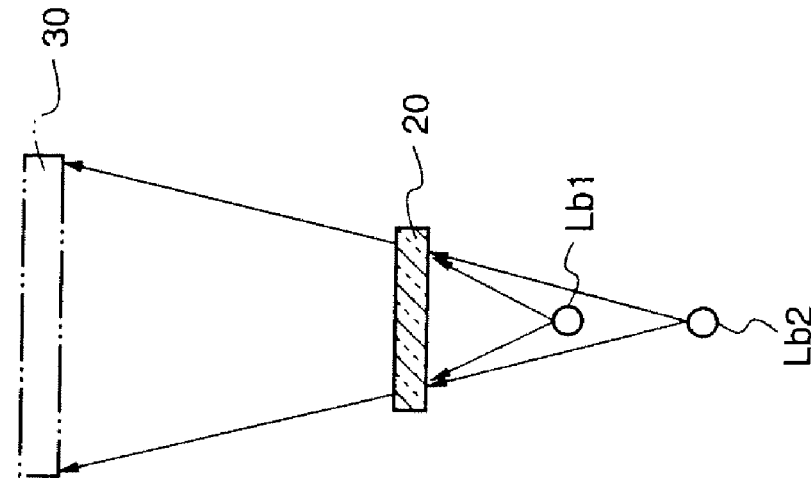
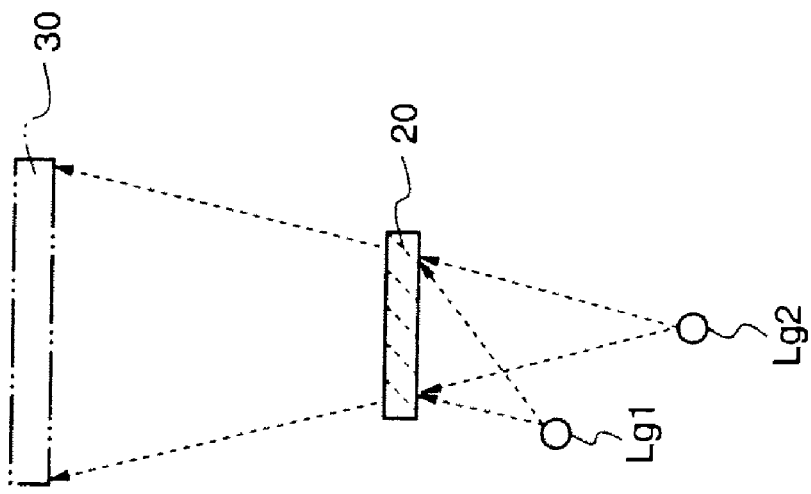

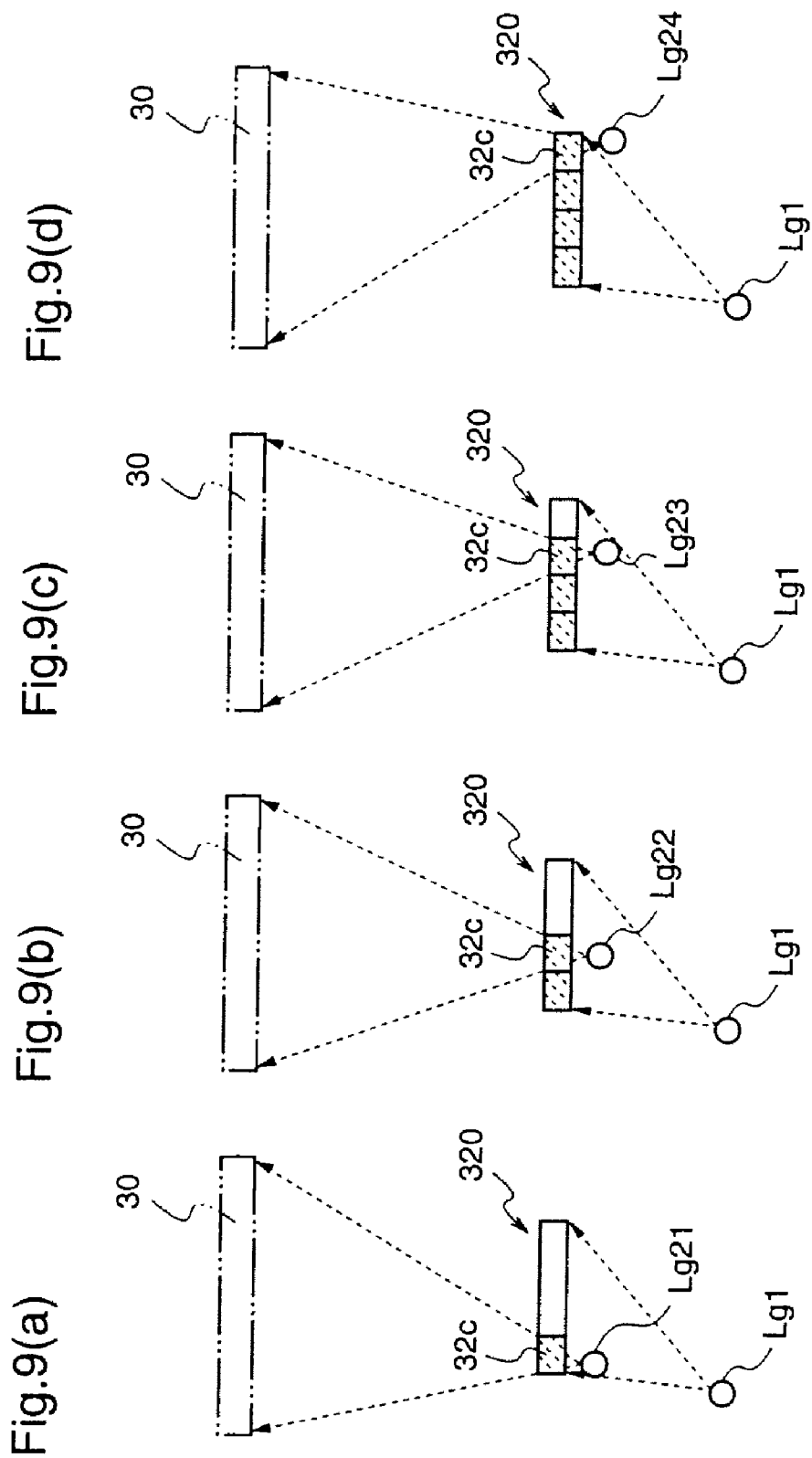

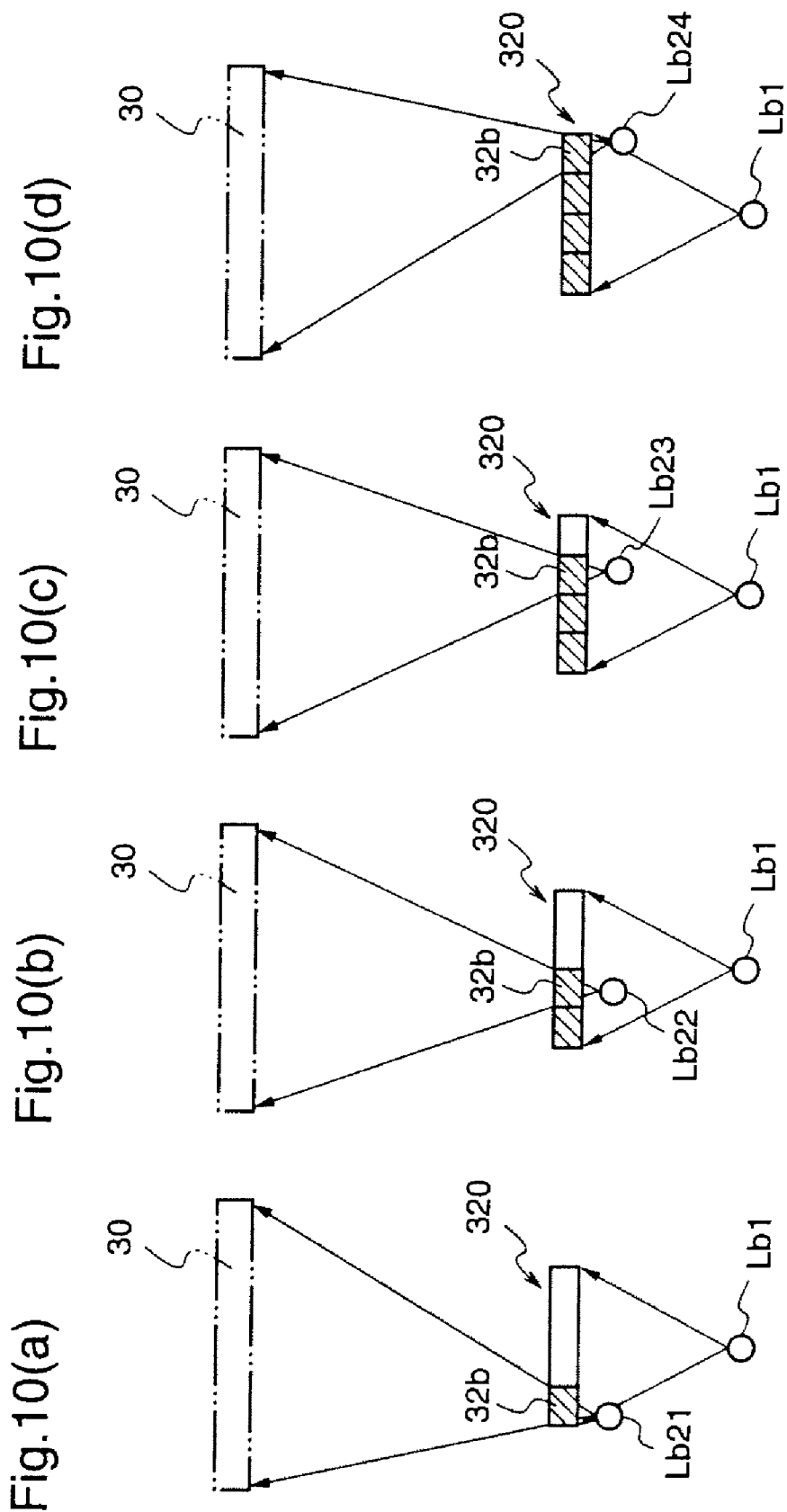

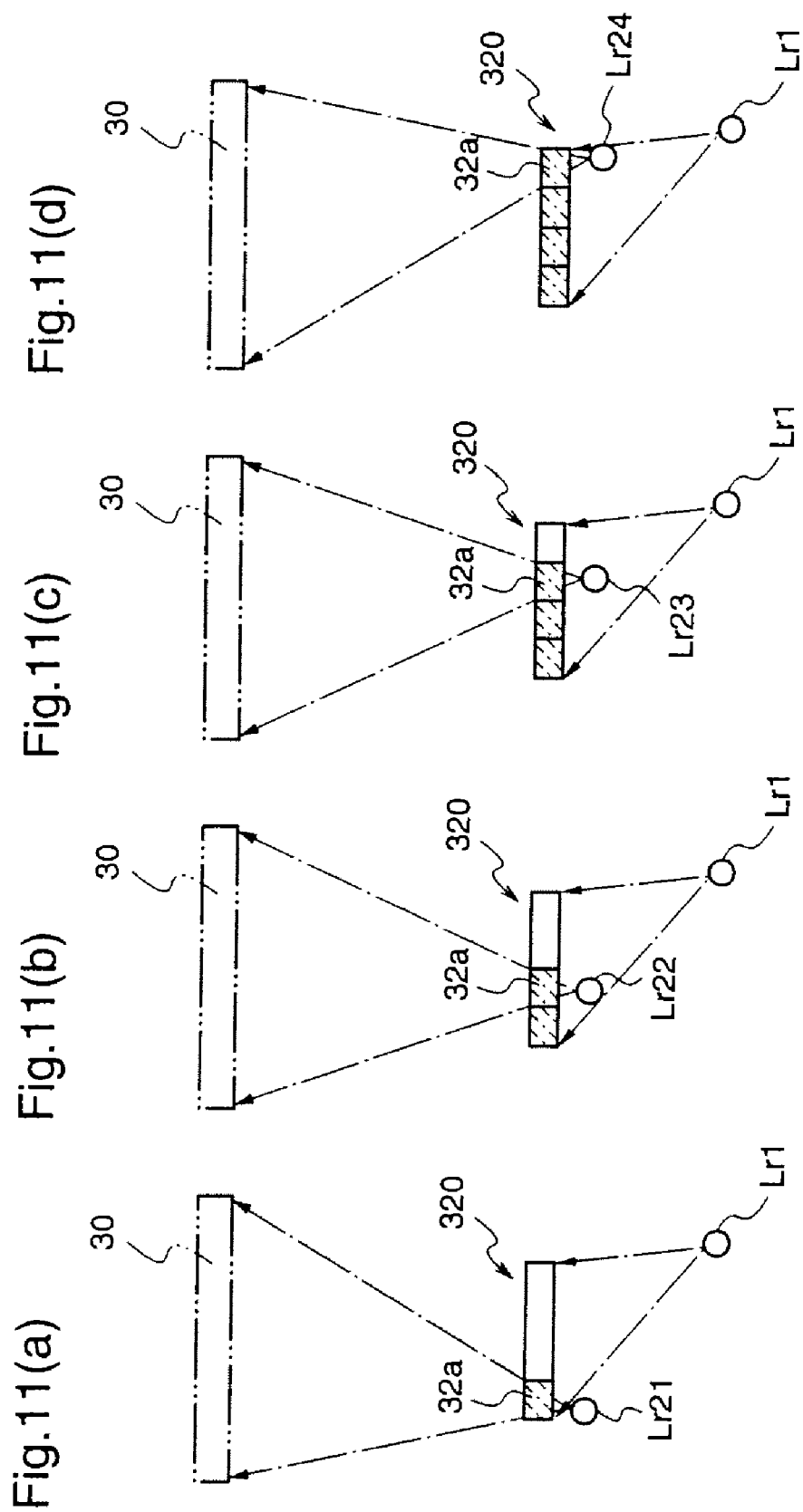

LIGHT SOURCE DEVICE, AND TWO-DIMENSIONAL IMAGE DISPLAY DEVICE

TECHNICAL FIELD

The present invention relates to a light source device and a two-dimensional image display device and, more particularly, to a light source device that realizes miniaturization of a two-dimensional image display device, and a compact two-dimensional image display device using the light source device.

BACKGROUND ART

In recent years, a two-dimensional image display device (laser display device) capable of representing bright colors has attracted attention. This device adopts three coherent light sources of red, green, and blue (e.g., laser light sources), and has a construction as shown in FIG. 13.

In FIG. 13, reference numeral 600 denotes a two-dimensional image display device using conventional laser light sources. The two-dimensional image display device 600 comprises red, green, and blue laser light sources 601a, 601b, and 601c, beam expanders 602a, 602b, and 602c, light integrators 603a, 603b, and 603c, mirrors 604a and 604c, diffusion plates 606a, 606b, and 606c, diffusion plate wobbling means 605a, 605b, and 605c, spatial light modulation elements 607a, 607b, and 607c, field lenses 608a, 608b, and 608c, a dichroic prism 609, and a projection lens 610.

In the two-dimensional image display device 600, lights emitted from the red, green, and blue laser light sources 601a, 601b, and 601c are expanded by the beam expanders 602a, 602b, and 602c, and pass through the light integrators 603a, 603b, and 603c, respectively. The optical paths of the red and blue lights that pass through the light integrators 603a and 603c are bent at 90° by the mirrors 604a and 604c, respectively, while the optical path of the green light that passes through the light integrator 603b is not bent, and the respective lights irradiate the spatial light modulation elements 607a, 607b, and 607c through the field lenses 608a, 608b, and 608c, and the diffusion plates 606a, 606b, and 606c, respectively. The lights emitted from the three kinds of laser light sources 601a, 601b, and 601c pass through the light integrators 603a, 603b, and 603c, respectively, whereby the illumination distributions on the spatial light modulation elements 607a, 607b, and 607c are made uniform. The lights which are individually modulated by the spatial light modulation elements 607a, 607b, and 607c are multiplexed by the dichroic prism 609 to be coaxial beams that propagate in the same optical path, and further, enlarged and projected by the projection lens 610 to be focused on the screen 61. At this time, since the laser light interference is high, speckle noises are superposed on the image projected on the screen 61. In order to avoid the speckle noises, the diffusion plates 606a, 606b, and 606c are wobbled by the diffusion plate wobbling means 605a, 605b, and 605c, respectively, whereby the speckle noises are temporally averaged.

In the conventional two-dimensional image display device 600 shown in FIG. 13, however, in order to expand the lights from the three kinds of laser light sources 601a~601c and make the intensity distributions of the lights uniform, three beam expanders and three light integrators are needed. Further, in order to convert the lights from the three kinds of laser light sources into coaxial beams which are parallel to each other and propagate in the same optical path, a lot of lenses and mirrors must be disposed in the device. Consequently, the conventional two-dimensional image display device is undesirably increased in scale.

In order to solve this problem, the optical system of the two-dimensional image display device may be constituted such that, as shown in FIG. 14, initially lights emitted from laser light sources corresponding to three colors of red, green, and blue are mixed using dichroic mirrors, and thereafter, the mixed light is transmitted through a beam expander and a light integrator.

In FIG. 14, reference numeral 700 denotes a conventional two-dimensional display device using laser light sources. The two-dimensional image display device 700 comprises red, green, and blue laser light sources 701a, 701b, and 701c, collimator lenses 704a, 704b, and 704c, first and second dichroic mirrors 705a and 705b, a beam expander 702, a light integrator 703, a projection lens 10, and a liquid crystal panel 71.

The dichroic mirror is obtained by laminating multiple films on a glass substrate, and varies the transmissivity in accordance with the wavelength. In the two-dimensional image display device 700 shown in FIG. 15, the first dichroic mirror 705a reflects lights of wavelengths shorter than a threshold wavelength of about 580 nm, and passes only lights having wavelengths longer than this threshold wavelength. The second dichroic mirror 705b reflects lights of wavelengths shorter than a threshold wavelength of about 490 nm, and passes only lights having wavelengths longer than this threshold wavelength.

In the conventional two-dimensional image display device 700 using the laser light sources, initially, lights emitted from the red, green, and blue laser light sources 701a, 701b, and 701c are collimated by the collimator lenses 704a, 704b, and 704c, respectively, and the collimated lights are converted to coaxial beams that are parallel to each other and propagate through the same optical path, by the first and second dichroic mirrors 705a and 705b, and thereafter, the coaxial beams are applied to the beam expander 702. The light beams incident on the beam expander 702 are expanded by the beam expander 702 and then pass through the light integrator 703. The light integrator 703 includes two fly-eye lenses 703a and 703b each comprising rectangle element lenses being two-dimensionally arrayed, and a collimator lens 703c. The lights incident on the respective element lenses of the first fly-eye lens 703 are focused on the two-dimensional spatial light modulation element by the second fly-eye lens 703b, whereby the light intensity distributions on the respective element lenses are multiplexed on the two-dimensional spatial light modulation element, and consequently, the light intensity distribution on the two-dimensional spatial light modulation element becomes uniform.

The light that passes through the light integrator 703 and thereby has the uniform intensity distribution is focused on the liquid crystal panel 71 by the projection lens 710 (refer to Japanese Published Patent Application No. 10-293268 (Patent Document 1)).

DISCLOSURE OF THE INVENTION

Problems to be Solved by the Invention

As described above, the scale of the whole two-dimensional image display device can be further reduced in the construction shown in FIG. 14 wherein the lights emitted from the respective laser light sources 701a~701c are multiplexed by the first and second dichroic mirrors 705a and 705b to convert them into coaxial beams, and then the coaxial beams are expanded, and thereafter, the light intensity distributions thereof are made uniform by the light integrator 703, relative to in the construction shown in FIG. 13 wherein the lights emitted from the respective laser light sources 601a~601c are expanded by the beam expanders 602a~602c, and then the light intensity distributions thereof are made uniform by the light integrators 603a~603b, and thereafter, the light beams are multiplexed by the dichroic prism 609 to convert them into coaxial beams.

In the conventional two-dimensional image display device, however, even when the whole optical system thereof is constituted as shown in FIG. 14, the number of parts is still large and thereby the device scale is too large to install the device on a compact device such as a handy phone.

The present invention is made to solve the above-described problems and has for its object to provide an ultracompact light source device that can be mounted on a compact device, and a compact two-dimensional image display device using the light source device.

Measures to Solve the Problems

In order to solve the above-mentioned problems, a light source device according to the present invention comprises at least two coherent light sources; and a diffraction part for diffracting light which is emitted from at least one of the coherent light sources so that the respective lights emitted from the at least two coherent light sources propagate through the same optical path.

Therefore, the respective lights emitted from the plural coherent light sources can be easily multiplexed in the diffraction part, resulting in an ultracompact light source device.

Further, in the light source device according to the present invention, the optical propagation paths of the respective lights emitted from the at least two coherent light sources overlap each other on the diffraction part.

Therefore, the light source device can be further miniaturized.

Further, in the light source device according to the present invention, the center axes of the optical propagation paths of the respective lights emitted from the at least two coherent light sources intersect at one point on the diffraction part.

Therefore, the light source device can be further miniaturized.

Further, in the light source device according to the present invention, the at least two coherent light sources are disposed on the same submount.

Therefore, heat radiation of three light sources can be carried out by heat radiation of the single submount, whereby heat radiation of the light sources in the light source device can be realized by the simple construction.

Further, in the light source device according to the present invention, the coherent light sources are a coherent light source that emits red light, a coherent light source that emits blue light, and a coherent light source that emits green light.

Therefore, a compact light source device that emits R, G, and B lights can be provided.

Further, in the light source device according to the present invention, the light emitted from at least one coherent light source among the coherent light sources passes through the diffraction part without being diffracted by the diffraction part.

Therefore, the production process of the diffraction part can be reduced, thereby providing the light source device at lower cost.

Further, in the light source device according to the present invention, the diffraction part comprises a single diffraction element, and the diffraction element diffracts the light emitted from at least one coherent light source so that the respective lights emitted from the at least two coherent light sources propagate through the same optical path.

Therefore, the diffraction part is downsized, whereby the light source device can be ultra-miniaturized.

Further, in the light source device according to the present invention, the diffraction element is further provided with a lens function.

Therefore, the respective lights emitted from the plural coherent light sources can irradiate the same planar region above the diffraction element.

Further, in the light source device according to the present invention, the diffraction part comprises a first diffraction element for receiving at least two lights, and diffracting at least one of the received lights so that the received at least two lights propagate through the same optical path; and a second diffraction element for diffracting the light emitted from at least one coherent light source among the at least two coherent light sources so that the center axes of the optical propagation paths of the lights emitted from the respective coherent light sources intersect at one point on the first diffraction element.

Therefore, it is possible to provide, at lower cost, a compact light source device in which the diffraction part can easily convert the respective lights emitted from the plural coherent light sources into coaxial beams to multiplex the same.

Further, in the light source device according to the present invention, the second diffraction element is further provided with a lens function, and the second diffraction element condenses the respective lights emitted from the at least two coherent light sources so that the respective lights diffracted by the second diffraction element irradiate the same region of the first diffraction element.

Therefore, the respective lights emitted from the plural coherent light sources can irradiate the same region of the first diffraction element that is disposed above the second diffraction element.

Further, in the light source device according to the present invention, the diffraction element is a volume hologram, and plural gratings are multiplexed on the volume hologram, which gratings receive the respective lights emitted from the at least two coherent light sources, and change the propagation directions of the respective lights.

Therefore, it is possible to realize an ultra-miniaturized light source device in which the diffraction part can easily convert the respective lights from the plural coherent light sources into coaxial beams to multiplex the same.

Further, in the light source device according to the present invention, the diffraction element is regionally divided, and the respective lights that are diffracted in the divided regions of the diffraction element irradiate the same planar region.

Therefore, the diffraction element can be provided with the function of a light integrator, whereby the intensity distributions of the lights that irradiate the space can be made uniform.

Further, in the light source device according to the present invention, the diffraction element is regionally divided in a lattice pattern.

Therefore, the intensity distributions of the lights that irradiate the space can be made more uniform.

Further, a two-dimensional image display device according to the present invention comprises at least two coherent light sources; a diffraction part for diffracting light emitted from at least one coherent light source so that the respective lights emitted from the at least two coherent light sources propagate in the same optical path; and a two-dimensional spatial light modulation element for receiving the respective lights that are diffracted by the diffraction part to be coaxial beams, said element being provided in a space above the diffraction part.

Therefore, it is possible to miniaturize the two-dimensional image display device that displays the lights emitted from the light source device.

Further, the two-dimensional image display according to the present invention further includes a control part for controlling the operations of the at least two coherent light sources, and the at least two coherent light sources are a coherent light source that emits red light, a coherent light source that emits green light, and a coherent light source that emits blue light, and the control part controls the three coherent light sources so that the coherent light sources are time-shared to sequentially emit lights.

Therefore, it is possible to display a moving picture in the two-dimensional image display device.

Effects of the Invention

According to the present invention, a light source device having plural coherent light sources is provided with a diffraction part that diffracts the respective lights emitted from the coherent light sources so that the lights propagate in the same optical path. Therefore, an optical system for multiplexing the respective lights emitted from the plural coherent light sources into coaxial beams can be downsized, thereby providing an ultracompact light source device.

Further, according to the light source device of the present invention, the light emitted from at least one coherent light source among the plural coherent light sources passes through the diffraction part without being diffracted by the diffraction part. Therefore, the number of gratings to be multiplexed on the diffraction part can be reduced, whereby the light source device can be constituted at low cost.

Further, according to the light source device of the present invention, the diffraction part is constituted by first and second diffraction gratings, and the second diffraction grating diffracts the lights from the plural coherent light sources so that these lights irradiate the same region of the first diffraction element, while the first diffraction grating diffracts the respective lights that pass through the second diffraction element so that these lights become coaxial beams. Therefore, it is possible to provide a compact light source device which can easily multiplex the lights from the plural light sources to be coaxial beams.

Further, according to the light source device of the present invention, the plural coherent light sources are disposed on the same submount. Therefore, heat radiation of the plural light sources can be carried out by heat radiation of the single submount, thereby facilitating heat radiation of the light source device.

Further, according to the light source device of the present invention, the diffraction part is regionally divided, and the divided regions of the diffraction part are respectively provided with plural gratings as well as functions of concave lenses. Therefore, the intensity distributions of the lights emitted from the diffraction part can be made uniform as well as the lights emitted from the plural coherent light sources can be easily converted into coaxial beams to be multiplexed. Further, the diffraction part having the light integrator that makes the intensity distributions of the lights emitted from the diffraction part uniform is more compact and can be fabricated using cheaper materials as compared with the conventional lens array, whereby the light source device can be realized at lower cost.

Further, according to the two-dimensional image display device of the present invention, the light source device is miniaturized using the diffraction element, whereby the two-dimensional image display device can be miniaturized.

Further, according to the two-dimensional image display device of the present invention, since the diffraction part of the light source device also has the function of a light integrator, the intensity distributions of the lights emitted from the light source device become uniform without the necessity of using fly array lenses that are conventionally needed for making the light intensity distributions uniform, whereby the two-dimensional image display device in which the intensity distributions of the lights from the light sources are uniform can be more miniaturized, and further, the number of constituents of the two-dimensional image display device can be reduced. As the result, the two-dimensional image display device having the uniform intensity distributions of the lights from the light sources can be easily assembled at low cost.

BRIEF DESCRIPTION OF THE DRAWINGS

FIG. 2 is a diagram illustrating a method for fabricating a diffraction part according to the first embodiment of the present invention, and more specifically, FIGS. 2(a), 2(b), and 2(c) illustrate processes for fabricating gratings that diffract lights emitted from green, blue, and red laser light sources, respectively.

FIG. 6 is a diagram illustrating a method for fabricating a second volume hologram of a diffraction part according to the second embodiment of the present invention, and more specifically.

FIG. 7 is a diagram illustrating a method for fabricating a first volume hologram of the diffraction part according to the second embodiment of the present invention, and more specifically.

FIG. 9 is a diagram for explaining a method for fabricating a grating for green light of a diffraction part according to the third embodiment of the present invention, and more specifically, FIGS. 9(a)~9(d) illustrate processes for performing interference exposure onto divided four regions that are arranged in one line.

FIG. 10 is a diagram for explaining a method for fabricating a grating for blue light of the diffraction part according to the third embodiment of the present invention, and more specifically, FIGS. 10(a)~10(d) illustrate processes for performing interference exposure onto divided four regions that are arranged in one line.

FIG. 11 is a diagram for explaining a method for fabricating a grating for red light of the diffraction part according to the third embodiment of the present invention, and more specifically, FIGS. 11(a)~11(d) illustrate processes for performing interference exposure onto divided four regions that are arranged in one line.

Figure 1A:
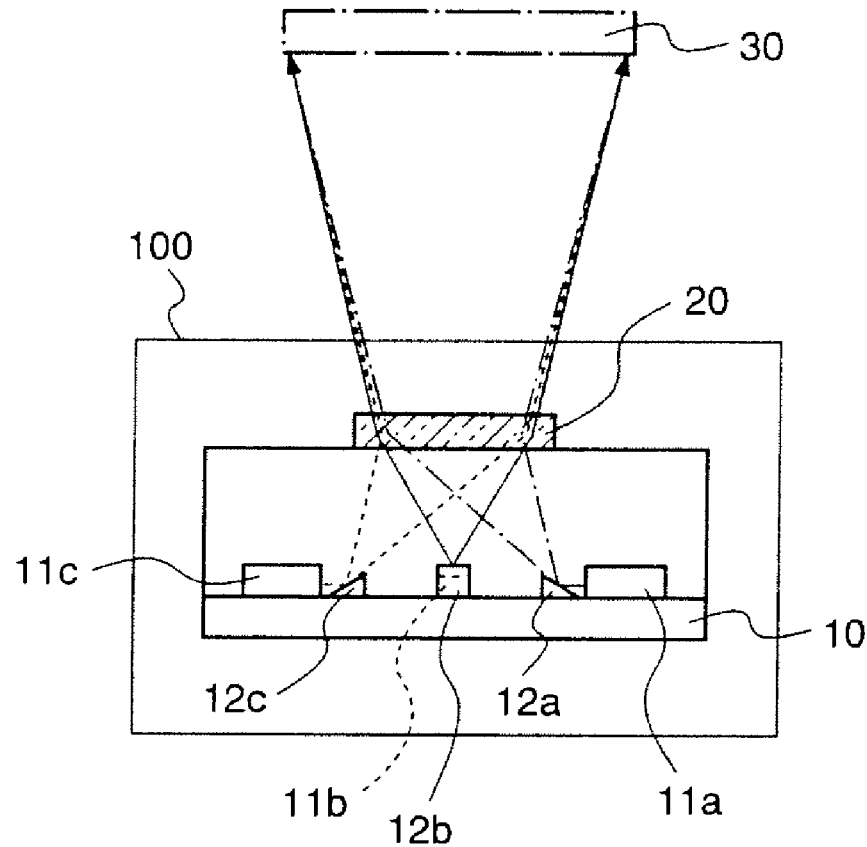
FIGS. 1(a) and 1(b) are a side view and a plan view illustrating a construction of a light source device according to a first embodiment of the present invention.

DESCRIPTION OF REFERENCE NUMERALS 10, 10a, 10b, 10c . . . submount
11a, 11b, 11c, 21a, 21b, 21c, 601a, 601b, 601c, 701a, 701b, 701c . . . laser light source
12a, 12b, 12c . . . prism
32 . . . divided regions
32a, 32b, 32c . . . grating
20, 220, 320 . . . diffraction part
221 . . . first volume hologram
222 . . . second volume hologram
222a, 222b, 222c . . . grating
30.607a, 607b, 607c, 707 . . . spatial light modulation element
51, 61 . . . screen
71 . . . liquid crystal panel
100, 100a, 100b, 200, 300 . . . light source device
500, 600, 700 . . . two-dimensional image display device
510, 710 . . . projection lens
520 . . . control unit
530 . . . video signal switching unit
540 . . . laser switching part
550a, 550b, 550c . . . laser driving unit
560, 608a, 608b, 608c . . . field lens
602a, 602b, 602c . . . beam expander
603a, 603b, 603c . . . light integrator
604a, 604c . . . mirror
605a, 605b, 605c . . . diffusion plate wobbling means
606a, 606b, 606c . . . diffusion plate
609 . . . dichroic prism
610 . . . projection lens
704a, 704b, 704c . . . collimator lens
705a, 705b . . . dichroic mirror

BEST MODE TO EXECUTE THE INVENTION

Hereinafter, embodiments of the present invention will be described.

Embodiment 1

In this first embodiment, a description will be given of a light source device in which a single diffraction element diffracts light beams emitted from three coherent light sources that emit red, blue, and green lights so that these lights become coaxial beams, thereby to multiplex the respective lights. In the following description, "coaxial beams" means lights that propagate in the same optical path, and "light axis" means a center axis of a light propagation path.

Figure 1B:
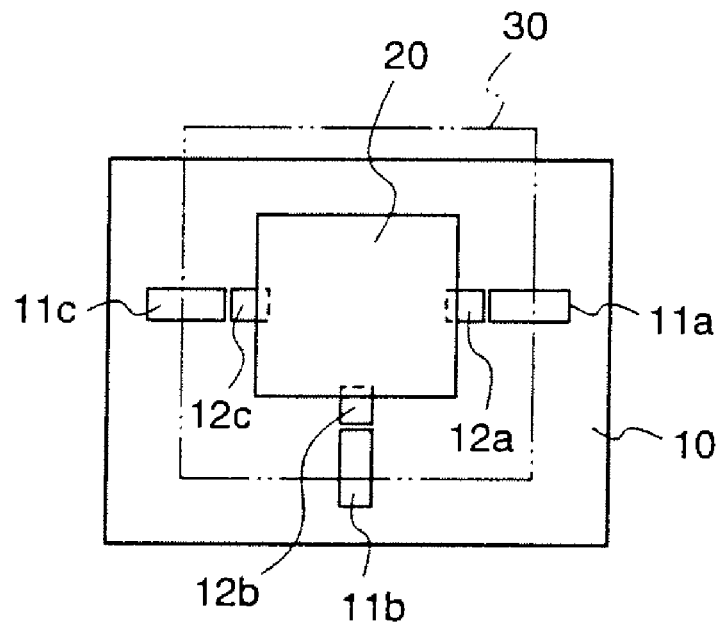

FIG. 1 is a diagram illustrating the construction of the light source device according to the first embodiment, wherein FIG. 1(a) is a side view and FIG. 1(b) is a plan view.

In FIG. 1, reference numeral 100 denotes a light source device according to the first embodiment, and the light source device 100 is used as a light source for a two-dimensional image display device. The light source device 100 includes coherent light sources, i.e., three semiconductor lasers 11a~11c emitting red light, blue light, and green light (hereinafter referred to simply as "laser light sources"), and a submount 10, such as a silicon substrate, on which the laser light sources 11a~11c are directly mounted. Further, the light source device 100 includes a diffraction unit 20 which is disposed above the submount 10, and diffracts light beams emitted from at least one coherent light source, in this first embodiment, light beams emitted from the two laser light sources 11a, 11b, and 11c, so that all the light beams emitted from the three coherent light sources become coaxial beams; and prisms 12a, 12b, and 12c which are disposed on the submount 10, and reflect the light beams emitted from the three laser light sources 11a, 11b, and 11c so that the light beams emitted from the laser light sources 11a, 11b, and 11c irradiate the same region of the diffraction unit 20. Further, a spatial light modulation element 30 for spatially modulating the amplitudes of the respective lights which are converted to the coaxial beams by the diffraction unit 20 is disposed above the diffraction part 20.

The respective laser light sources 11a~11c are surface-emitting lasers, and the red and green laser light sources 11a and 11b are disposed on a single straight line while the blue laser light source 11b is disposed on a straight line that is perpendicular to the above-mentioned straight line. The reflection angles of the reflection surfaces of the prisms 12a, 12b, and 12c are set so that the light axes of the emitted lights from the laser light sources 11a, 11b, and 11c, which are reflected at the reflection surfaces, and the light axis of the emitted light from the laser light source 11b intersect at one point on the diffraction unit 20.

In this first embodiment, the diffraction unit 20 comprises a single volume hologram. A plurality of gratings for diffracting the lights emitted from the respective laser light sources 11a~11c to convert these lights into coaxial beams are multiply-formed in the volume hologram. The volume hologram of the first embodiment also has a lens function for condensing the respective lights that pass through the diffraction unit 20 so that the respective lights irradiate the same region of the spatial light modulation element 30 disposed above the diffraction part 20.

Hereinafter, a method for fabricating the diffraction part 20 according to the first embodiment will be described.

FIG. 2 is a diagram illustrating a method for fabricating the volume hologram according to the first embodiment, wherein FIG. 2(a) shows a method of forming a grating for the light emitted from the green light laser source 11c, FIG. 2(b) shows a method of forming a grating for the light emitted from the blue light laser source 11b, and FIG. 2(c) shows a method of forming a grating for the light emitted from the red light laser source 11a.

For example, a light source Lg1 and a light source Lg2 which have the same wavelength as that of the green light laser source 11c are used for fabrication of a grating corresponding to the light emitted from the green light laser source 11c. At this time, the light sources Lg1 and Lg2 emit laser lights which are emitted from the same light source and divided. For example, light emitted from a single laser source is introduced into an optical fiber, and further, the fiber is divided into two fibers by a fiber coupler, and the emission facets of the two fibers are disposed in the positions of the light sources Lg1 and Lg2, respectively. Further, the light source Lg1 is disposed so that its optical position with respect to the volume hologram 20 matches the position of the laser light source 11c shown in FIGS. 1(a) and 1(b), and the light source Lg2 is disposed in the center of projection that projects the light emitting surface of the diffraction part 20 onto the entire light receiving surface of the spatial light modulation element 30. In this first embodiment, since the spatial light modulation electrode 30 is positioned directly above the diffraction part 20, the light source Lg2 is disposed on a straight line that is perpendicular to the light emission surface of the diffraction part 20 (refer to FIG. 2(a)). Then, the volume hologram is subjected to interference exposure with the lights emitted from the light sources Lg1 and Lg2. Thereby, an interference pattern is recorded on the volume hologram to fabricate a Bragg grating that diffracts and condenses the light emitted from the laser light source 11c.

A light source Lb1 and a light source Lb2 which have the same wavelength as that of the blue light laser source 11b are used for fabrication of a grating corresponding to the light emitted from the blue light laser source 11b. At this time, the light sources Lb1 and Lb2 emit laser lights which are emitted from the same light source and divided. For example, light emitted from a single laser source is introduced into an optical fiber, and further, the fiber is divided into two fibers by a fiber coupler, and the emission facets of the two fibers are disposed in the positions of the light sources Lb1 and Lb2, respectively. Further, the light source Lb1 is disposed so that its optical position with respect to the volume hologram 20 matches the position of the laser light source 11b shown in FIG. 1, and the light source Lb2 is disposed in the same position as the light source Lg2 (refer to FIG. 2(b)). Then, the volume hologram is subjected to interference exposure with the lights emitted from the light sources Lb1 and Lb2. Thereby, an interference pattern is further recorded on the volume hologram to fabricate a Bragg grating that condenses the light emitted from the laser light source 11b.

A light source Lr1 and a light source Lr2 which have the same wavelength as that of the red light laser source 11a are used for fabrication of a grating corresponding to the light emitted from the green light laser source 11a. At this time, the light sources Lr1 and Lr2 emit laser lights which are emitted from the same light source and divided. For example, light emitted from a single laser source is introduced into an optical fiber, and further, the fiber is divided into two fibers by a fiber coupler, and the emission facets of the two fibers are disposed in the positions of the light sources Lr1 and Lr2, respectively. Further, the light source Lr1 is disposed so that its optical position with respect to the volume hologram 20 matches the position of the laser light source 11a shown in FIG. 1, and the light source Lr2 is disposed in the same position as the light source Lg2 (refer to FIG. 2(c)). Then, the volume hologram is subjected to interference exposure with the lights emitted from the light sources Lr1 and Lr2. Thereby, an interference pattern is further recorded on the volume hologram to fabricate a Bragg grating that condenses the light emitted from the laser light source 11a.

The interference exposure of the volume hologram must be carried out three times so that the gratings corresponding to the respective emitted lights from the three laser sources are formed in the single volume hologram, and therefore, each interference exposure is carried out with such a light intensity that the photosensitive material constituting the volume hologram is completely exposed by the three times of exposures.

Next, the function and effect will be described.

In the light source device 100, when lights are emitted from the laser light sources 11a~11c of red, blue, and green lights which are disposed on the submount 10, the lights emitted from the three laser light sources 11a, 11b, and 11c are reflected by the prisms 12a, 12b, and 12c on the submount 10 so that the light axes of the respective emitted lights intersect at one point on the diffraction part 20.

Then, the red, blue, and green laser lights emitted from the respective laser light sources 11a, 11b, and 11c are multiplexed by the gratings corresponding to the respective lights in the diffraction part 20 so as to be coaxial beams as shown in FIG. 1, and the coaxial beams irradiate the same area of the spatial light modulation element 30, i.e., the light receiving surface. That is, the emitted lights from the red, blue, and green laser light sources 11a, 11b, and 11c, which are reflected by the prisms, are respectively diffracted and condensed when passing through the diffraction part 20. Thereby, the light emitted from the diffraction part 20, which is obtained by multiplexing the lights emitted from the three laser light sources, irradiates the light receiving surface that is a given area of the spatial light modulation element 30.

As described above, according to the first embodiment, the light source device is provided with the three laser light sources 11a~11c, and the diffraction part 20 comprising a single volume hologram which multiplexes the lights emitted from the laser light sources 11a~11c so that these lights become coaxial beams. Therefore, the optical system for converting the lights emitted from the three laser light sources into coaxial beams can be miniaturized, thereby realizing an ultracompact two-dimensional image display device that can be mounted on a compact apparatus such as a handy phone.

Further, since the three light sources are disposed on the same submount 10, heat radiation of the three light sources can be carried out by heat radiation of the single submount 10, whereby heat radiation of the light sources in the light source device can be facilitated.

Further, in this first embodiment, surface-emitting lasers are adopted as the three light sources 11a~11c, and the blue light laser is disposed on a straight line that is perpendicular to a straight line connecting the green light laser and the red light laser. However, arrangement of the laser light sources is not restricted thereto.

Figure 3A:
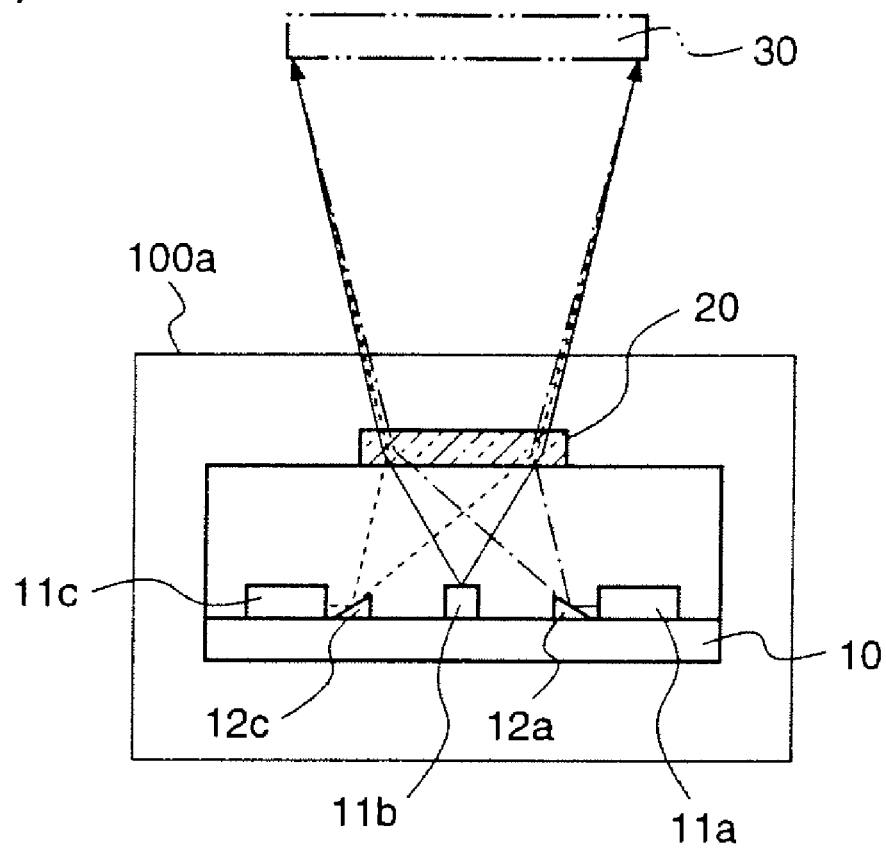
FIGS. 3(a) and 3(b) are a side view and a plan view illustrating another construction of a light source device according to the first embodiment of the present invention.
Figure 3B:
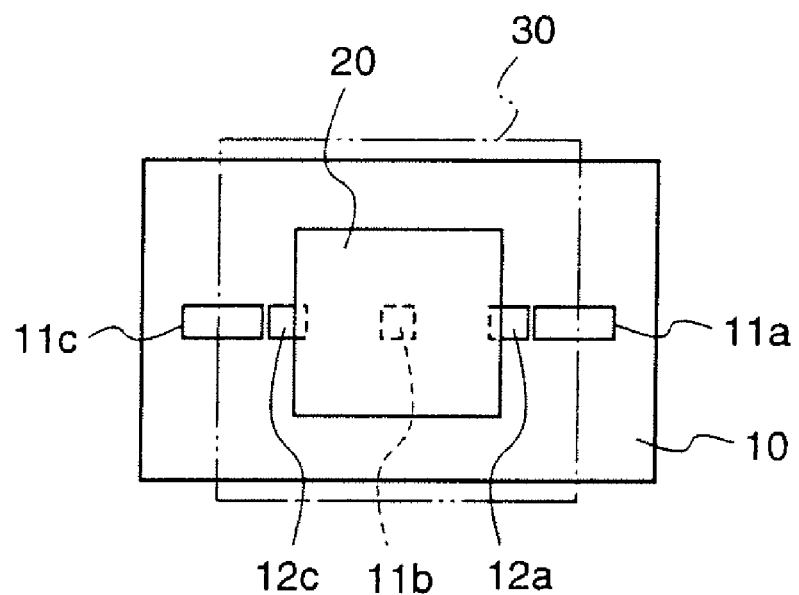

For example, a surface-emitting laser is used as a blue light laser, and this is disposed between the green light laser and the red light laser. FIGS. 3(a) and 3(b) are a side view and a plan view illustrating a light source device 100a of such construction. In FIGS. 3(a) and 3(b), the same reference numerals as those shown in FIGS. 1(a) and 1(b) denote the same elements as those of the light source device 100.

In this case, the number of prisms disposed on the submount 10 can be reduced, whereby the cost of the light source device 100 can be reduced.

Figure 4A:
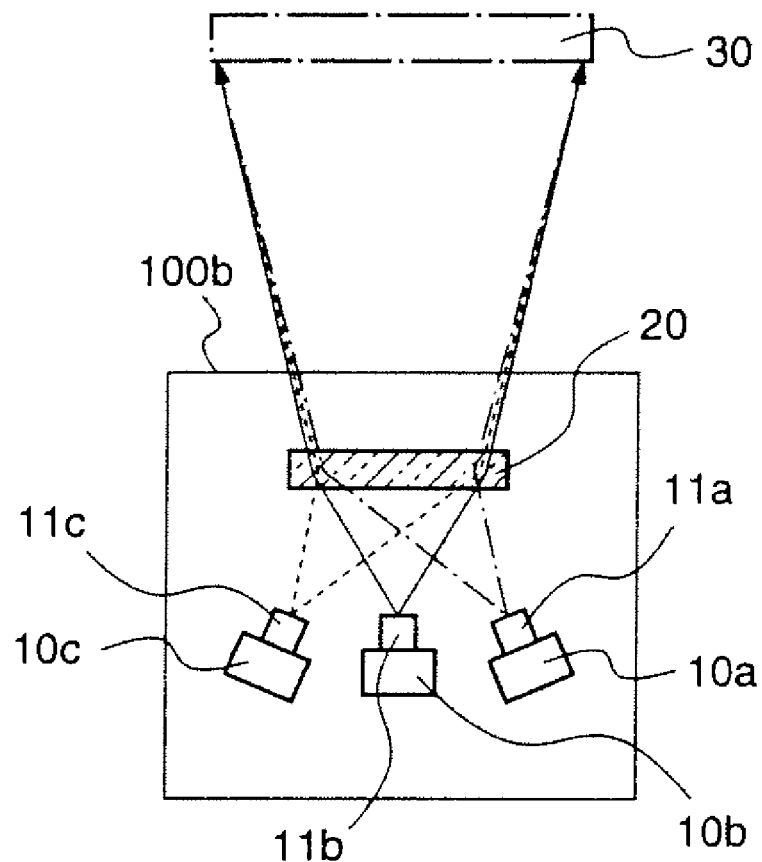
FIGS. 4(a) and 4(b) are a side view and a plan view illustrating still another construction of a light source device according to the first embodiment of the present invention.
Figure 4B:
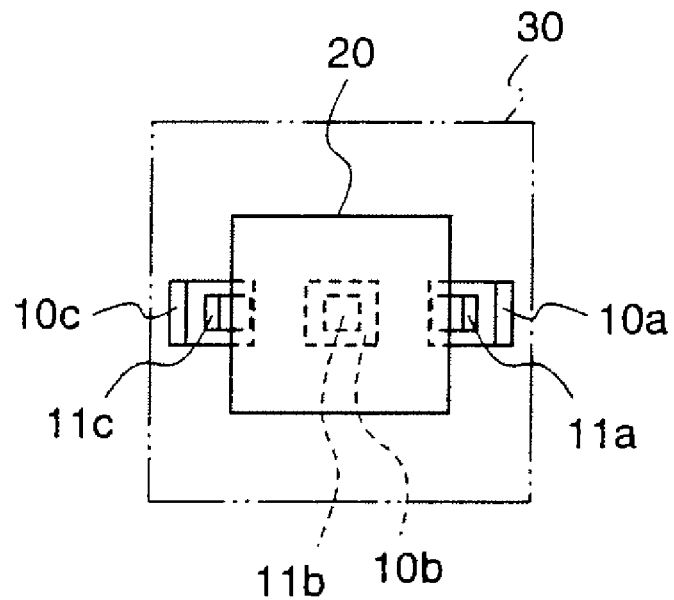

Further, while in this first embodiment the semiconductor laser chips as the laser light sources are disposed on the same submount 10, the semiconductor laser chips as the laser light sources may be mounted on different submounts 10a~10c, respectively, as in a light source device 100b shown in FIGS. 4(a) and 4(b). FIGS. 4(a) and 4(b) are a side view and a plan view of the light source device 100b, wherein the same reference numerals as those in FIGS. 1(a) and 1(b) denote the same elements as those of the light source device 100.

When the semiconductor laser chips as the three light sources are mounted on the separated submounts 10a~10c, respectively, the degree of freedom in layout of the three light sources is increased, thereby facilitating design of the light source device in a compact apparatus.

Further, while in this first embodiment the diffraction part 20 also has the function of a condenser lens, it is not necessary to condense the respective lights by the diffraction part 20 so long as the lights passing through the diffraction part 20 fall within the plane of the spatial light modulation element 30. In this case, since it is not necessary to form, in the volume hologram, a grating for condensing the light emitted from the laser light source 11b, the process steps for fabricating the volume hologram can be reduced, thereby providing the device at lower cost.

Further, while the first embodiment is described for the case where three coherent light sources are used, at least two light sources suffice. For example, when four or more coherent light sources are provided, blue-green or yellow light may be provided in addition to the red, blue, and green lights, thereby providing a light source device that can represent a wider range of bright colors.

Further, in the first embodiment, the light source device is used as a light source for a two-dimensional image display apparatus, and the spatial light modulation element 30 spatially varies the amplitude of the light emitted from the diffraction part 20. However, the light source device according to the first embodiment is not restricted to that for a two-dimensional image display device, and it may be used as a light source for a device, other than a two-dimensional image display device, in which the spatial light modulation element spatially varies the phase of the light from the diffraction part 20.

Embodiment 2

While in the first embodiment the diffraction part comprises a single diffraction element, in this second embodiment the diffraction part comprises two diffraction elements.

Figure 5A:
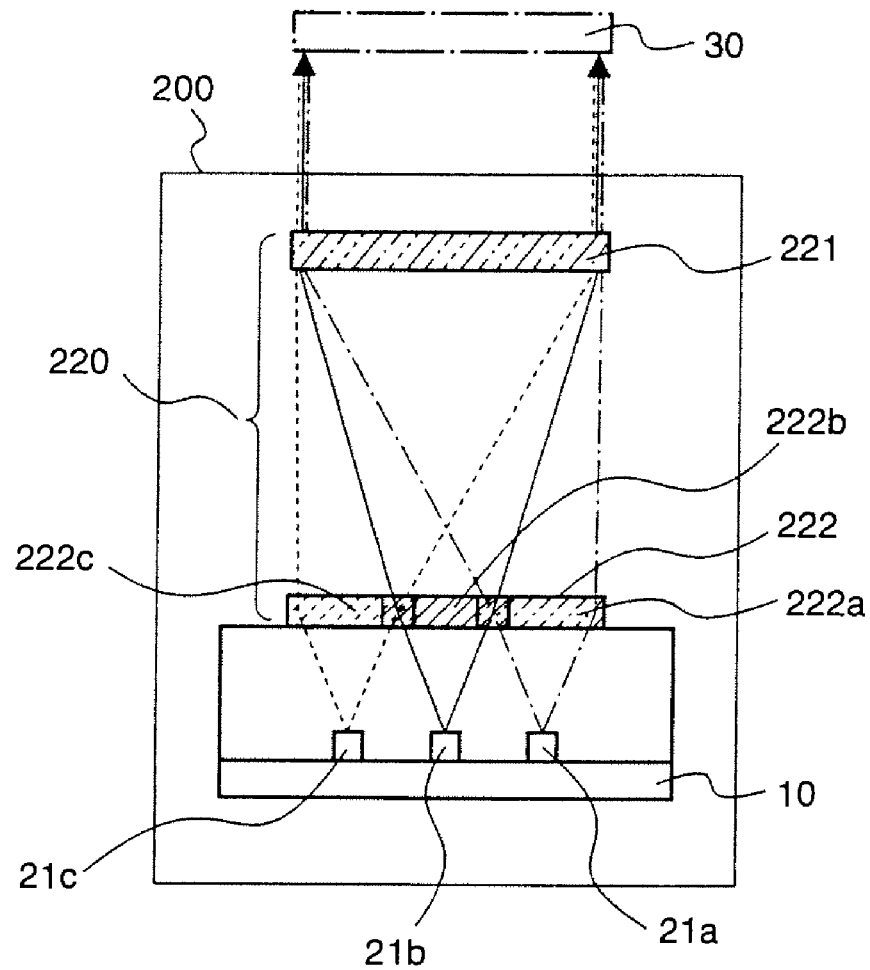
FIGS. 5(a) and 5(b) are a side view and a plan view illustrating a construction of a light source device according to a second embodiment of the present invention.
Figure 5B:
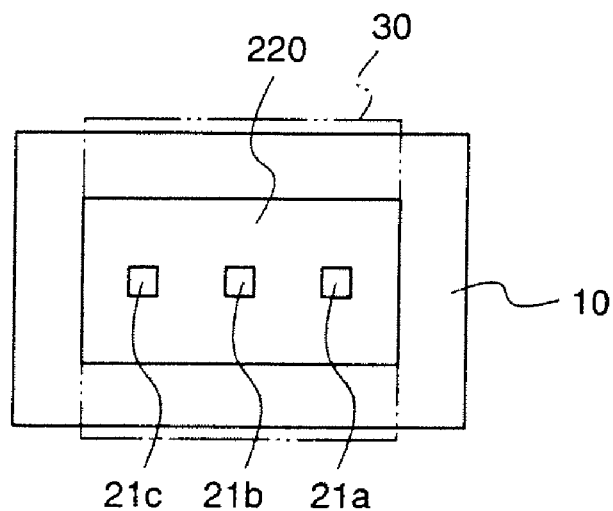

Initially, the construction of a light source device according to the second embodiment will be described. FIG. 5 is a diagram illustrating the construction of the light source device according to the second embodiment, wherein FIG. 5(a) is a side view and FIG. 5(b) is a plan view.

In FIG. 5, reference numeral 200 denotes a light source device according to the second embodiment. The light source device 200 is provided with a submount 10 such as a silicon substrate; three semiconductor laser light sources 21a~21c which are disposed on the submount 10, and emit red light, blue light, and green light, respectively (hereinafter simply referred to as "laser light sources"); and a diffraction part 220 which is disposed above the submount 10 and diffracts the respective lights emitted from the three laser light sources 21a~21c so that the respective lights become coaxial beams. Further, a spatial light modulation element 30 for spatially varying the amplitudes of the lights that are converted to the coaxial beams by the diffraction part 220 is disposed above the diffraction part 220.

The three laser light sources 21a~21c are surface-emitting lasers that emit lights from upper surfaces of laser chips, and these lasers are disposed along a single straight line on the submount 10.

In this second embodiment, the diffraction part 220 comprises two pieces of volume holograms (first and second volume holograms) 221 and 222.

The second volume hologram 222 is disposed above the submount 10, and diffracts the respective lights emitted from the three laser light sources 21a~21c so that the light axes of the respective emitted lights intersect at one point on the first volume hologram which is disposed above the second volume hologram 222, and further, condenses the respective emitted lights so as to irradiate the same area of the first volume hologram 221. Accordingly, the second volume hologram 222 is provided with a plurality of gratings according to the lights emitted from the respective laser light sources 21a~21c, more specifically, a grating 222a for red light, a grating 222b for blue light, and a grating 222c for green light, so that the respective lights irradiate the same region of the first volume hologram 221. The first volume hologram 221 further diffracts the emitted lights from the respective light sources, which are diffracted by the second volume hologram 222, thereby converting the lights into coaxial beams. Accordingly, a plurality of gratings are multiply-formed on the first volume hologram 221, and the gratings diffract the emitted lights from the respective light sources, which pass through the second volume hologram 222, so that these lights are converted to coaxial beams.

In this second embodiment, in order to further miniaturize the light source device 200, the intervals of the light sources 21a~21c are reduced so that the lights emitted from the respective light sources overlap each other on the second volume hologram 222. Therefore, on the second volume hologram 222, the gratings 222a~222c for red light, blue light, and green light are partially overlapped.

Hereinafter, a description will be given of a method for fabricating the diffraction part 220 according to the second embodiment.

Figure 6C:
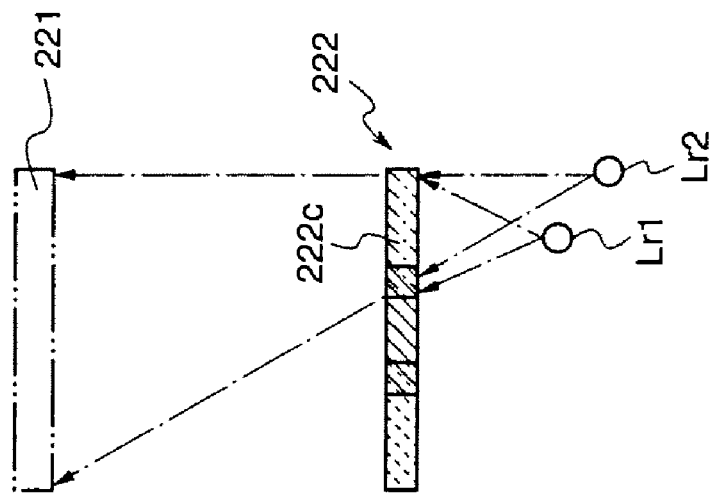
FIGS. 6(a), 6(b), and 6(c) illustrate processes for fabricating gratings that diffract lights emitted from green, blue, and red laser light sources, respectively.
Figure 6B:
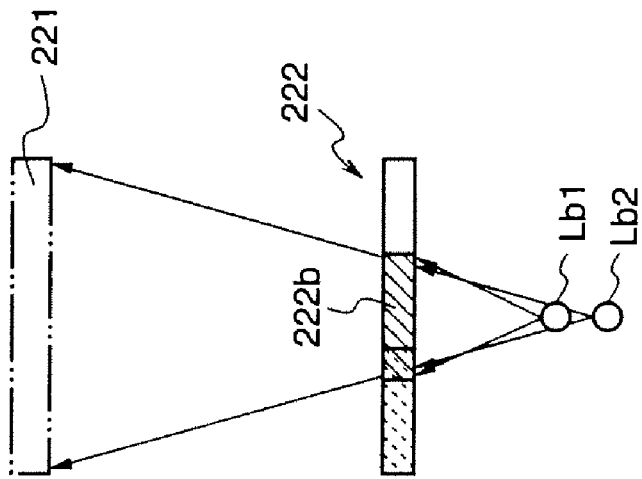
Figure 6A:
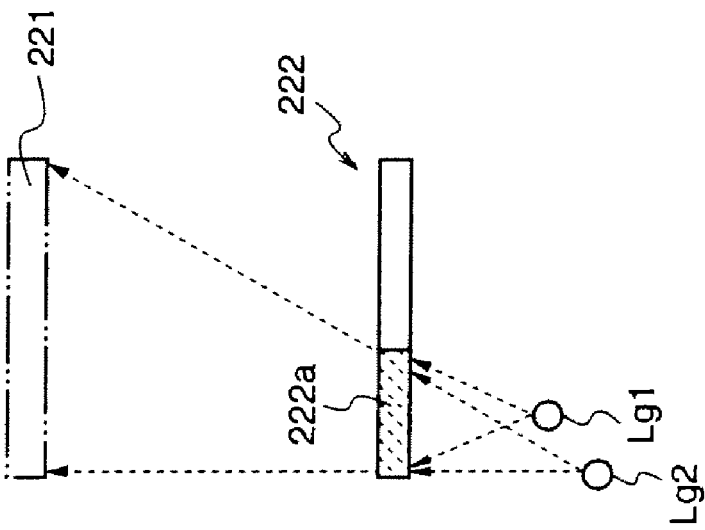
Figure 7C:
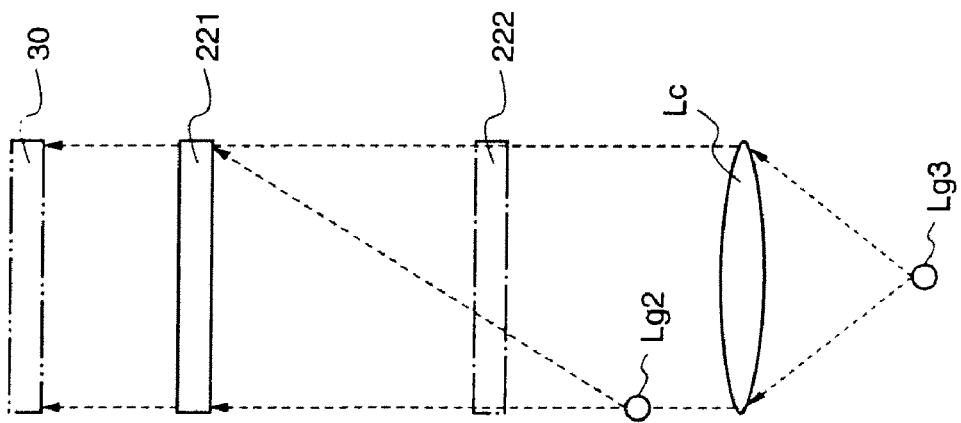
FIGS. 7(a), 7(b), and 7(c) illustrate processes for fabricating gratings that diffract lights emitted from green, blue, and red laser light sources, respectively.
Figure 7B:
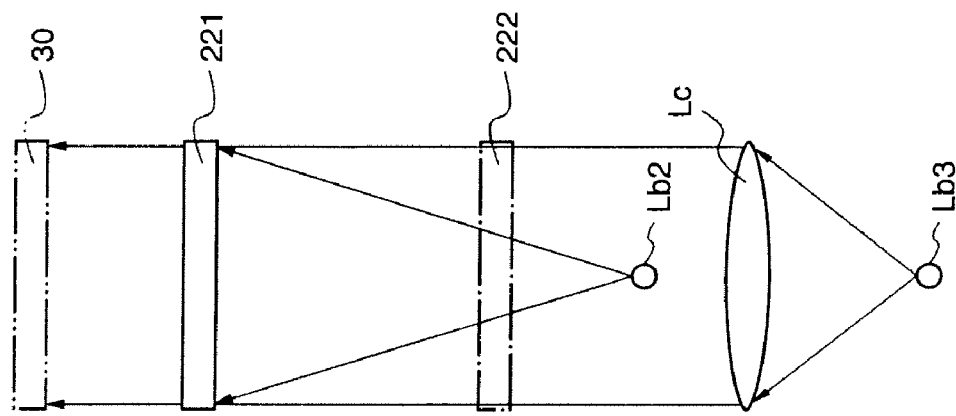
Figure 7A:
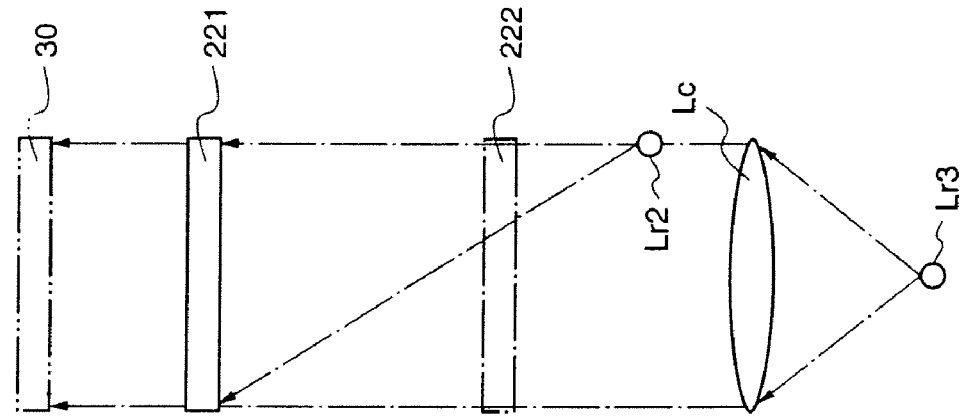

FIG. 6 is a diagram illustrating a method for fabricating the second volume hologram according to the second embodiment, wherein FIG. 6(a) shows a method of fabricating a grating for green light, FIG. 6(b) shows a method of fabricating a grating for blue light, and FIG. 6(c) shows a method of fabricating a grating for red light. Further, FIG. 7 is a diagram illustrating a method for fabricating the first volume hologram according to the second embodiment, wherein FIG. 7(a) shows a method of fabricating a grating for green light, FIG. 7(b) shows a method of fabricating a grating for blue light, and FIG. 7(c) shows a method of fabricating a grating for red light.

Initially, the method for fabricating the second volume hologram 222 will be described.

The second volume hologram 222 diffracts the lights emitted from the respective light sources 21a~21c so that the light axes of these lights intersect at one point on the first volume hologram 221, and condenses the respective emitted lights so that these lights irradiate the same region of the first volume hologram 221.

For example, a light source Lg1 and a light source Lg2 having the same wavelength as that of the green light laser source 21c are used for fabrication of a grating corresponding to the light emitted from the green light laser source 21c. The light sources Lg1 and Lg2 emit laser lights which are emitted from the same light source and divided. For example, light emitted from a single laser light source is introduced into an optical fiber, and further, the optical fiber is divided into two fibers with a fiber coupler, and the emission facets of the two fibers are disposed in the positions of the Lg1 and Lg2. The light source Lg1 is disposed such that its optical position with respect to the volume hologram 222 matches the position of the laser light source 21c shown in FIGS. 5(a) and 5(b), and the light source Lg2 is disposed in the center of projection when a region in the second volume hologram 222, which region is irradiated with the light emitted from the light source Lg1, is expanded and projected onto the entire surface of the first volume hologram 221 (refer to FIG. 6(a)). Then, the second volume hologram 222 is subjected to interference exposure by the lights emitted from the light sources Lg1 and Lg2. Thereby, an interference pattern is recorded on the second volume hologram 222 to form a Bragg grating 222c for diffracting and condensing the light emitted from the laser light source 21c. During the interference exposure, a region other than the region to be exposed should be shielded with a light shielding mask having apertures corresponding to the divided regions.

A light source Lb1 and a light source Lb2 having the same wavelength as that of the blue light laser source 21*b* are used for fabrication of a grating corresponding to the light emitted from the blue light laser source 21*b*. The light sources Lb1 and Lgb emit laser lights which are emitted from the same light source and divided. For example, light emitted from a single laser light source is introduced into an optical fiber, and further, the optical fiber is divided into two fibers with a fiber coupler, and the emission facets of the two fibers are disposed in the positions of the Lb1 and Lb2. The light source Lb1 is disposed such that its optical position with respect to the volume hologram 222 matches the position of the laser light source 21*b* shown in FIGS. 5(*a*) and 5(*b*), and the light source Lb2 is disposed in the center of projection when a region in the second volume hologram 222, which region is irradiated with the light emitted from the light source Lb1, is expanded and projected onto the entire surface of the first volume hologram 221 (refer to FIG. 6(*b*)). Then, the second volume hologram 222 is subjected to interference exposure by the lights emitted from the light sources Lb1 and Lb2. Thereby, an interference pattern is recorded on the second volume hologram 222 to form a Bragg grating 222*b* for diffracting and condensing the light emitted from the laser light source 21*b*. During the interference exposure, a region other than the region to be exposed should be shielded with a light shielding mask having apertures corresponding to the divided regions.

A light source Lr1 and a light source Lr2 having the same wavelength as that of the green light laser source 21*a* are used for fabrication of a grating corresponding to the light emitted from the red light laser source 21*a*. The light sources Lr1 and Lr2 emit laser lights which are emitted from the same light source and then divided. For example, light emitted from a single laser light source is introduced into an optical fiber, and further, the optical fiber is divided into two fibers with a fiber coupler, and the emission facets of the two fibers are disposed in the positions of the Lr1 and Lr2. The light source Lr1 is disposed such that its optical position with respect to the volume hologram 222 matches the position of the laser light source 21*a* shown in FIGS. 5(*a*) and 5(*b*), and the light source Lr2 is disposed in the center of projection when a region in the second volume hologram 222, which is irradiated with the light emitted from the light source Lr1, is expanded and projected onto the entire surface of the first volume hologram 221. Then, the second volume hologram 222 is subjected to interference exposure by the lights emitted from the light sources Lr1 and Lr2. Thereby, an interference pattern is recorded on the second volume hologram 222 to form a Bragg grating 222*a* for diffracting and condensing the light emitted from the laser light source 21*a*. During the interference exposure, a region other than the region to be exposed should be shielded with a light shielding mask having apertures corresponding to the divided regions.

In this second embodiment, since the respective light sources are disposed closely so that the emitted lights from the light sources partially overlap each other on the second volume hologram 222, the adjacent Bragg grating 222*a* and Bragg grating 222*b* partially overlap, and the adjacent Bragg grating 222*b* and Bragg grating 222*c* partially overlap on the fabricated second volume hologram 222.

Next, a method for fabricating the first volume hologram 221 will be described.

The first volume hologram 221 diffracts and condenses the lights that are emitted from the respective light sources 21*a*~21*c* and pass through the second volume hologram 222 so that these lights become coaxial beams.

For example, a lens Lc and a light source Lg2 and a light source Lg3 having the same wavelength as that of the green light laser source 21*c* are used for fabrication of a grating corresponding to the light emitted from the green light laser source 21*c*. The light sources Lg2 and Lg3 emit laser lights which are emitted from the same light source and then divided. For example, light emitted from a single laser light source is introduced into an optical fiber, and further, the optical fiber is divided into two fibers with a fiber coupler, and the emission facets of the two fibers are disposed in the positions of the Lg2 and Lg3. The lens Lc condenses the divergent light from the light source Lg3 so that this light is incident on the first volume hologram as parallel light. The light source Lg2 is disposed in the center of projection when a region in the second volume hologram 222 where the grating 222*c* is formed is expanded and projected onto the entire surface of the first volume hologram 221. Then, the first volume hologram 221 is subjected to interference exposure by the lights emitted from the light sources Lg2 and Lg3. Thereby, an interference pattern is recorded on the first volume hologram 221 to form a Bragg grating for diffracting the light emitted from the laser light source 21*c*.

The interference exposure of the first volume hologram 221 is carried out such that the light sources Lg1 and Lg2 shown in FIG. 7(*a*) are replaced with a light source Lb2 and a light source Lb3 having the same wavelength as that of the blue light laser source 21*b* as shown in FIG. 7(*b*), and further, the light sources Lg1 and Lg2 shown in FIG. 7(*a*) are replaced with a light source Lr2 and a light source Lr3 having the same wavelength as that of the red light laser source 21*a* as shown in FIG. 7(*c*). Thereby, in the first volume hologram 221, gratings for diffracting the light emitted from the blue light laser source 21*b* and the light emitted from the red light laser source 21*a* are formed over the Bragg grating corresponding to the green light laser source 21*c*. At this time, the light source Lb2 is disposed in the center of projection when a region in the second volume hologram 222 where the grating 222*b* is formed is expanded and projected over the entire surface of the first volume hologram 221, and the light source Lr2 is disposed in the center of projection when a region in the second volume hologram 222 where the grating 222*a* is formed is expanded and projected over the entire surface of the first volume hologram 221.

Since it is necessary to perform three times of interference exposures on the first volume hologram so that the gratings corresponding to the lights emitted from the three laser light sources are formed on the single volume hologram, each interference exposure should be carried out with such a light intensity that a photosensitive material constituting the volume hologram is completely exposed by the three times of exposures.

Next, the function and effect will be described.

Initially, laser lights are emitted from the red, blue, and green light laser sources 21*a*~21*c* disposed on the submount 10, and the respective laser lights irradiate the second volume hologram 222 of the diffraction part 220.

The respective lights emitted from the laser light sources 21*a*~21*c* are respectively diffracted and condensed by the gratings 222*a*~222*c* for red light, blue light, and green light when passing through the second voltage hologram 222. Thereby, the light axes of the respective lights intersect at one point on the first volume hologram 221, and the lights irradiate the same region of the first volume hologram 221.

The respective lights which are diffracted and condensed by the second volume hologram 222 are diffracted and multiplexed so as to be coaxial beams that propagate in the same optical path as shown in FIG. 5(*a*) when passing through the first volume hologram 221, and irradiate the same region of the spatial light modulation element 30.

As described above, according to the second embodiment, the light source device is provided with the three laser light sources 21a~21c, and the diffraction part 220 comprising a volume hologram, which multiplexes the lights emitted from the laser light sources 21a~21c so that these lights become coaxial beams. Therefore, it is possible to realize an ultra-compact two-dimensional image display device that can be mounted on a compact apparatus such as a handy phone, as in the first embodiment.

Further, in this second embodiment, the diffraction part 220 is constituted by the first and second volume holograms 221 and 222, the lights emitted from the three laser light sources are diffracted by the second volume hologram 222 so that the light axes of these emitted lights intersect at one point on the first volume hologram 221, and the three laser lights from the second volume hologram 222 are diffracted by the first volume hologram 221 so that these laser lights irradiate the same region of the spatial light modulation element 30. Therefore, it is not necessary to make the light axes of the lights supplied from the respective light sources to the diffraction part 220 match on the diffraction part 220, whereby the light sources that emit lights in the vertical direction to the submount, such as surface-emitting lasers, can be directly disposed on the submount 10. As the result, the construction of the light source device can be simplified, and the assembly thereof can be facilitated. This leads to a reduction in cost of the light source device.

Further, since the three light sources 21a~21c are disposed on the same submount 10, heat radiation of the three light sources can be carried out by radiating heat from the single submount 10, whereby heat radiation of the light sources in the light source device can be easily carried out.

While in this second embodiment the second volume hologram 222 is constructed such that the boundary portions of the adjacent gratings 222a~222c are slightly overlapped, the second volume hologram 222 may be formed such that the greater parts of the gratings for the respective lights are overlapped. In this case, the scale of the device can be reduced.

Conversely, the second volume hologram 222 may be formed such that the gratings for the respective lights are not overlapped. In this case, although the scale of the light source device is somewhat increased, heat radiation of the light sources can be efficiently carried out because an interval is secured between adjacent light sources disposed on the same submount 10.

While in this second embodiment the second volume hologram 222 has a lens function, it is not necessary to condense the respective lights by the second volume hologram 222 as long as the irradiation areas of the lights that pass through the second volume hologram 222 falls within the plane of the first volume hologram 221. In this case, since only the different two gratings 222a and 222c for diffracting the lights emitted from the two laser light sources 21a and 21c are to be formed on the second volume hologram 222, the number of gratings to be multiply-formed onto the volume hologram can be reduced, thereby providing the device at lower cost.

Further, while the second embodiment is described for the case where three coherent light sources are used, at least two light sources will suffice.

Embodiment 3

A light source device according to the third embodiment is constructed such that the diffraction part of the light source device according to the first embodiment has a function of a light integrator for making the light intensity distributions of the lights emitted from the respective laser light sources uniform.

Figure 8A:
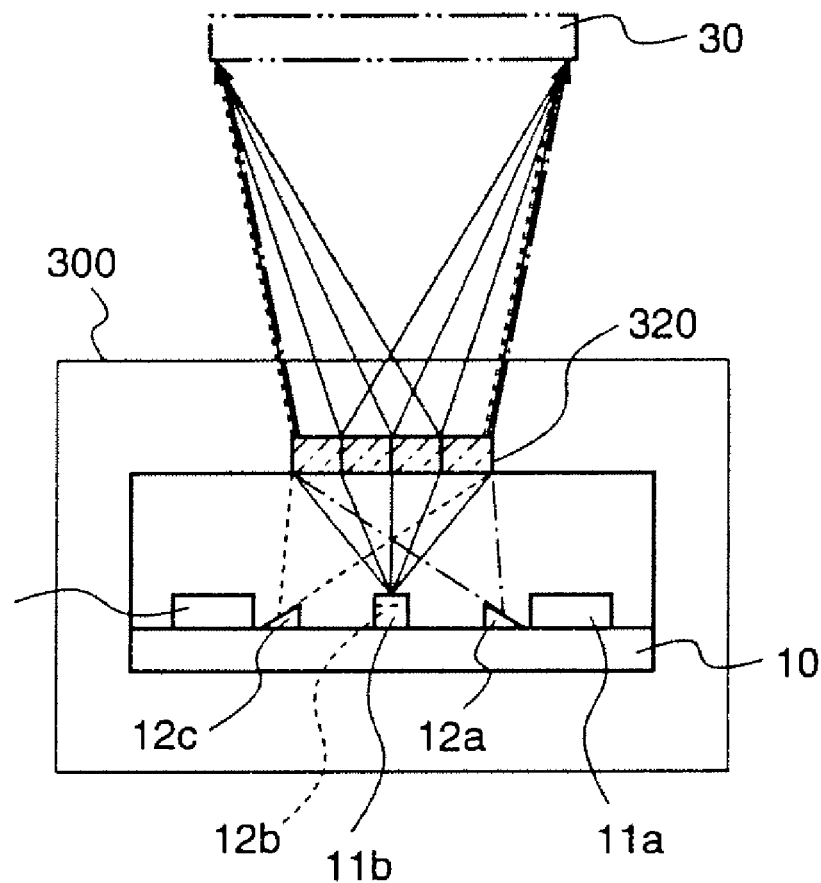
FIGS. 8(a) and 8(b) are a side view and a plan view illustrating a construction of a light source device according to a third embodiment of the present invention.
Figure 8B:
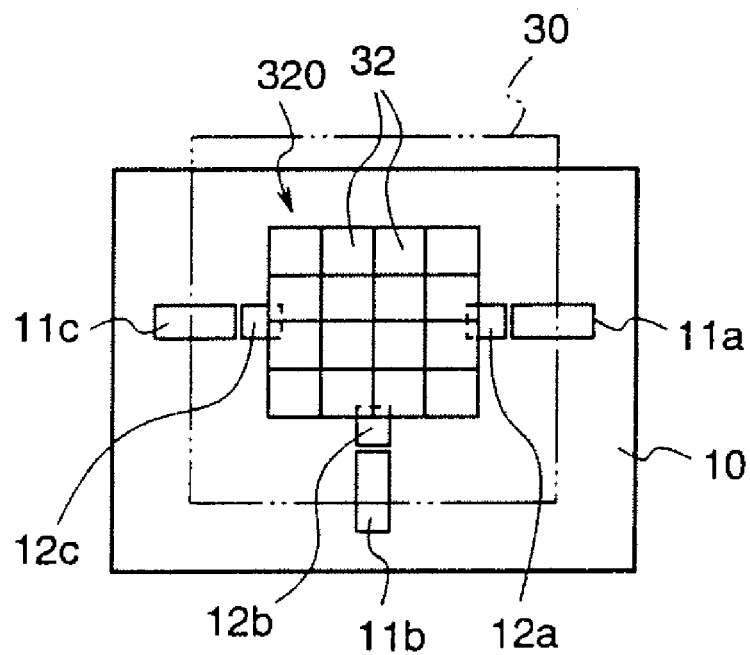

FIG. 8 is a diagram illustrating the construction of the light source device according to the third embodiment, wherein FIG. 8(a) is a side view and FIG. 8(b) is a plan view.

With reference to FIG. 8, reference numeral 300 denotes a light source device according to the third embodiment. The light source device 300 includes laser light sources 11a, 11b, and 11c of red light, blue light, and green light, respectively, prisms 12a, 12b, and 12c for reflecting lights emitted from the red and green laser light sources 11a and 11c, a submount 10 for supporting these laser light sources and prisms, and a diffraction part 320 through which the lights emitted from the laser light sources 11a, 11b, and 11c and reflected by the prisms 12a, 12b, and 12c pass. The laser light sources 11a~11c, the prisms 12a~12c, and the submount 10 are identical to those of the first embodiment.

In this third embodiment, the diffraction part 320 diffracts the incident lights and makes the light intensity distributions thereof uniform, and it is composed of a single volume hologram. The volume hologram 320 is divided into plural regions. In this third embodiment, it is divided into sixteen regions.

In the volume hologram 320, the divided sixteen regions 32 are arranged four by four. Gratings are multiply-formed on the respective divided regions 32, which gratings diffract the lights that are emitted from the light sources 11a~11c and applied to the respective regions so that the lights irradiate the entirety of the light irradiation surface of the spatial light modulation element 30. The respective regions of the volume hologram 320 have functions of concave lenses for expanding the divergence angles of the incident lights.

The emitted lights from the respective light sources, which are incident on the respective sixteen regions of the divided volume hologram, are diffracted to be coaxial beams by the gratings that are formed in the respective sixteen regions of the volume hologram, and the lights emitted from the respective sixteen regions of the volume hologram irradiate the same region of the spatial light modulation element that is provided above the diffraction part 320.

While in FIG. 8(a) the optical path of the light emitted from the blue light source 11b is mainly illustrated to simplify the figure, the lights emitted from the red and green light sources 11a and 11c are similarly applied to the divided regions of the diffraction part 320, and are diffracted and dispersed by the gratings that are multiply-formed on the respective divided regions, and further, irradiate the same region of the spatial light modulation element 30.

Hereinafter, a description will be given of a method for fabricating the diffraction part 320 according to the third embodiment.

FIG. 9 is a diagram illustrating a method of fabricating gratings for diffracting light that is emitted from the green light laser source, on the volume hologram of the third embodiment, FIG. 10 is a diagram illustrating a method of fabricating gratings for diffracting light that is emitted from the blue light laser source, on the volume hologram of the third embodiment, FIG. 11 is a diagram illustrating a method of fabricating gratings for diffracting light that is emitted from the red light laser source, on the volume hologram of the third embodiment.

In the volume hologram 320 of the third embodiment, it is necessary to form gratings in the respective sixteen regions into which the hologram 320 is divided. Therefore, a light source Lg1 and a light source Lg2 having the same wavelength as that of the green light laser source 11c are used for fabrication of gratings for diffracting the light emitted from the green light laser source 11c, as shown in FIGS. 9(a)~9(d). At this time, the light sources Lg1 and Lg2 emit laser lights which are emitted from the same light source and divided. For example, light emitted from a single laser light source is introduced into an optical fiber, and further, the optical fiber is divided into two fibers with a fiber coupler, and the emission facets of the two fibers are disposed in the positions of the Lg1 and Lg2. In interference exposure using these light sources, the light source Lg1 is fixed at a position where the optical position with respect to the volume hologram 320 matches the position of the laser light source 11c shown in FIGS. 8(a) and 8(b), and the position of the light source Lg2 is changed for each divided region 32.

For example, the light sources Lg1 and Lg2 are disposed as shown in FIGS. 9(a)~9(d), and four times of interference exposures are carried out, whereby gratings 32c are formed in the four regions arranged in a line, among the divided sixteen regions of the volume hologram 320. During the interference exposure for each region, the light source Lg2 is disposed in the center of projection when each region of the volume hologram 320 is expanded and projected onto the spatial light modulation element 30. Accordingly, the four times of interference exposures shown in FIGS. 9(a)~9(d) are performed for each line of the divided regions of the volume hologram 320, whereby gratings 32c for diffracting the emitted lights from the green light laser source 11c are formed on all the divided sixteen regions of the volume hologram 320. During the interference exposures for the respective divided regions 32, regions other than the regions to be exposed should be shielded with a light shielding mask having apertures corresponding to the divided regions.

Further, gratings for diffracting the light emitted from the blue light laser source 11b are fabricated as follows. That is, as shown in FIGS. 10(a)~10(d), interference exposure using a light source Lb1 and a light source Lb2 having the same wavelength as that of the blue light laser source 11b is carried out so that the light source Lb1 is fixed in a position where the optical position of the light source Lb1 with respect to the volume hologram 320 matches the position of the laser light source 11c, and the position of the light source Lb2 is varied for each divided region. At this time, the light sources Lb1 and Lb2 emit laser lights which are emitted from the same light source and divided. For example, light emitted from a single laser light source is introduced into an optical fiber, and further, the optical fiber is divided into two fibers with a fiber coupler, and the emission facets of the two fibers are disposed in the positions of the Lb1 and Lb2.

Also in this case, gratings 32b for diffracting the emitted light from the blue light laser source are formed in four regions arranged in a line among the divided sixteen regions 32 of the volume hologram 320 by four times of interference exposures shown in FIGS. 10(a)~10(d), and gratings 32b for diffracting the blue light are formed in all the divided sixteen regions 32 of the volume hologram 320 by performing the four times of interference exposures to the respective lines of the divided regions in the volume hologram 320. Also in this case, during the interference exposures for the respective divided regions, regions other than the regions to be exposed should be shielded.

Likewise, gratings for diffracting the light emitted from the red light laser source 11a are fabricated as follows. That is, as shown in FIGS. 11(a)~11(d), interference exposure using a light source Lr1 and a light source Lr2 having the same wavelength as that of the red light laser source 11a is carried out with the light source Lr1 being fixed in a position where the optical position of the light source Lr1 with respect to the volume hologram 320 matches the position of the laser light source 11a, and the position of the light source Lr2 being varied for each divided region. At this time, the light sources Lr1 and Lr2 emit laser lights which are emitted from the same light source and divided. For example, light emitted from a single laser light source is introduced into an optical fiber, and further, the optical fiber is divided into two fibers with a fiber coupler, and the emission facets of the two fibers are disposed in the positions of the Lr1 and Lr2.

Also in this case, gratings 32a for diffracting the emitted light from the red light laser source are formed in four regions arranged in a line among the divided sixteen regions 32 of the volume hologram 320, by four times of interference exposures shown in FIGS. 11(a)~11(d), and gratings 32a for diffracting the red light are formed in all the divided sixteen regions 32 of the volume hologram 320 by performing the four times of interference exposures to the respective lines of the divided regions. Also in this case, during the interference exposures for the respective divided regions, regions other than the regions to be exposed should be shielded.

Next, the function and effect will be described.

When lights are emitted from the laser light sources 11a~11c corresponding to the red light, blue light, and green light, the emitted lights from the laser light sources 11a, 11b, and 11c are reflected by the prisms 12a, 12b, and 12c disposed on the submount 10, and these reflected lights irradiate the diffraction part 320. At this time, the optical axes of the respective lights emitted from the laser light sources 11a~11c are matched on the diffraction part 320, and the respective lights irradiate the same region of the diffraction part 320.

When the three lights from the red, blue, and green light laser sources 11a~11c pass through the diffraction part 320, the optical axes of the red, blue, and green lights that pass the respective divided regions 32 of the diffraction part 320 are matched in the respective regions 32, and these lights are diffracted and dispersed so as to irradiate the same region, i.e., the entire surface of the spatial light modulation element 30. Thereby, the spatial light modulation element 30 is irradiated with light of uniform light intensity distribution, which is obtained by multiplexing the laser lights of the respective colors.

As described above, according to the third embodiment, the diffraction part 320 is regionally divided two-dimensionally, and the gratings for diffracting and dispersing the emitted lights from the respective light sources are multiply-formed on the respective divided regions of the diffraction part 320 so that the lights from the respective light sources, which pass through the respective regions, become coaxial beams, and irradiate the entire surface of the light irradiation region of the spatial light modulation element 30. Therefore, it is possible to provide an ultracompact light source device that can miniaturize the optical system for converting the emitted lights from the three laser light sources into coaxial beams, and that can make the intensity distributions of the lights from the respective light sources uniform on the spatial light modulation element 30.

Further, while a lens array constituting the conventional light integrator takes much cost for processing and the like, a volume hologram can be fabricated utilizing a compact and inexpensive photosensitive material (polymer). Therefore, when the diffraction part 320 comprising a volume hologram also has the function of a light integrator as described for this third embodiment, the cost of the device can be reduced.

While in this third embodiment the diffraction part 320 comprises a single volume hologram, the diffraction part may comprise two volume holograms as described for the second embodiment. In this case, the first volume hologram 221 shown in FIG. 5 is regionally divided as described for the third embodiment, whereby the intensity distributions of the lights from the respective light sources on the spatial light modulation element 30 can be made uniform as described for the third embodiment.

Further, while in this third embodiment the diffraction part 320 is divided into 16 regions, the regional division of the diffraction part is not restricted to the division into 16 regions, and it is possible to perform division into 64 regions or 128 regions, or more regions. Further, it is possible to perform the regional division of the diffraction part so that the numbers of divided regions arranged in the vertical and horizontal directions are varied according to the planar shape of the spatial light modulation element.

Embodiment 4

Hereinafter, a description will be given of a two-dimensional image display device using the light source device which is described for any of the first to third embodiments.

Figure 12:
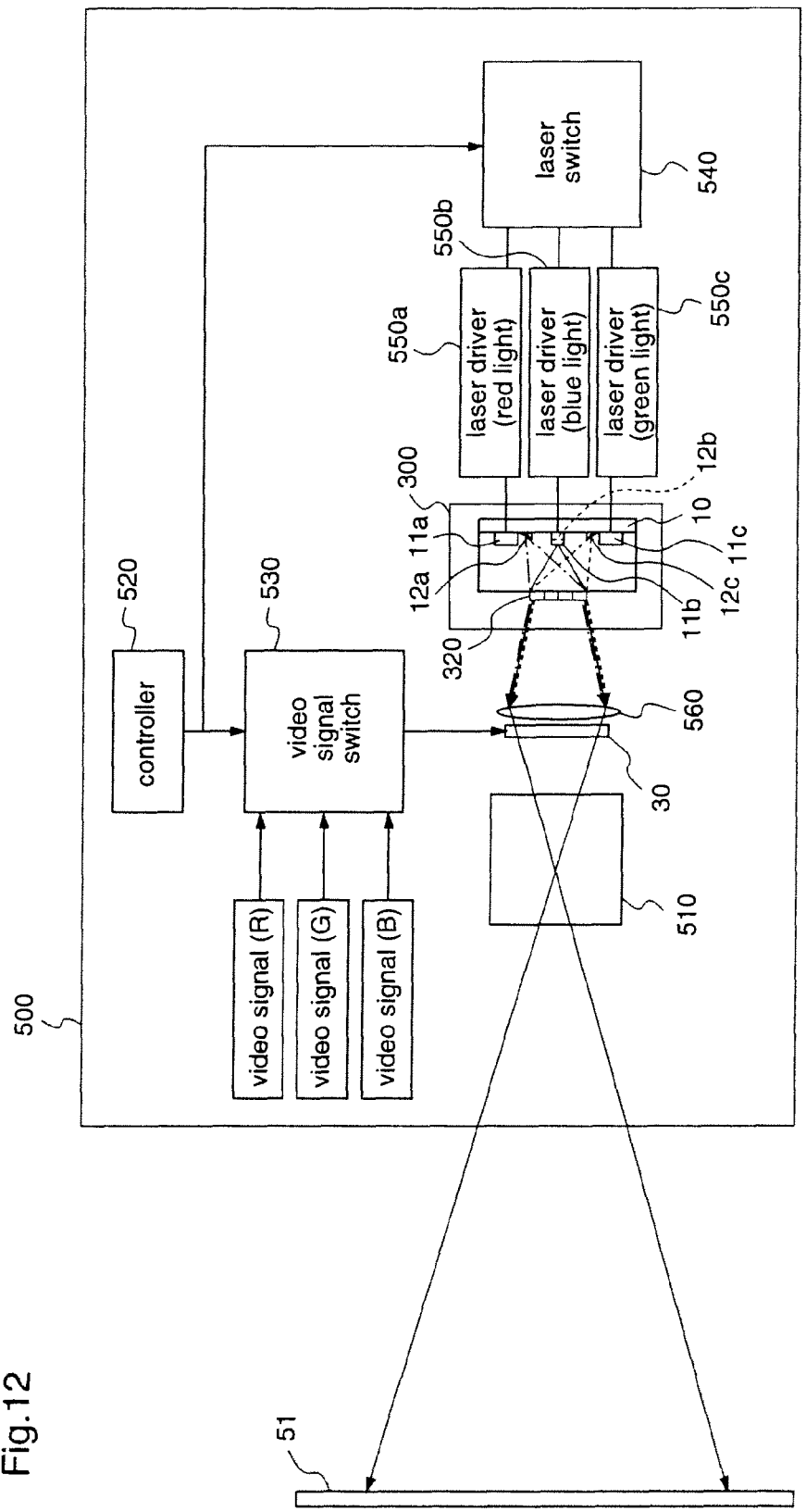
FIG. 12 is a diagram illustrating a construction of a two-dimensional image display device according to a fourth embodiment of the present invention.
Figure 13:
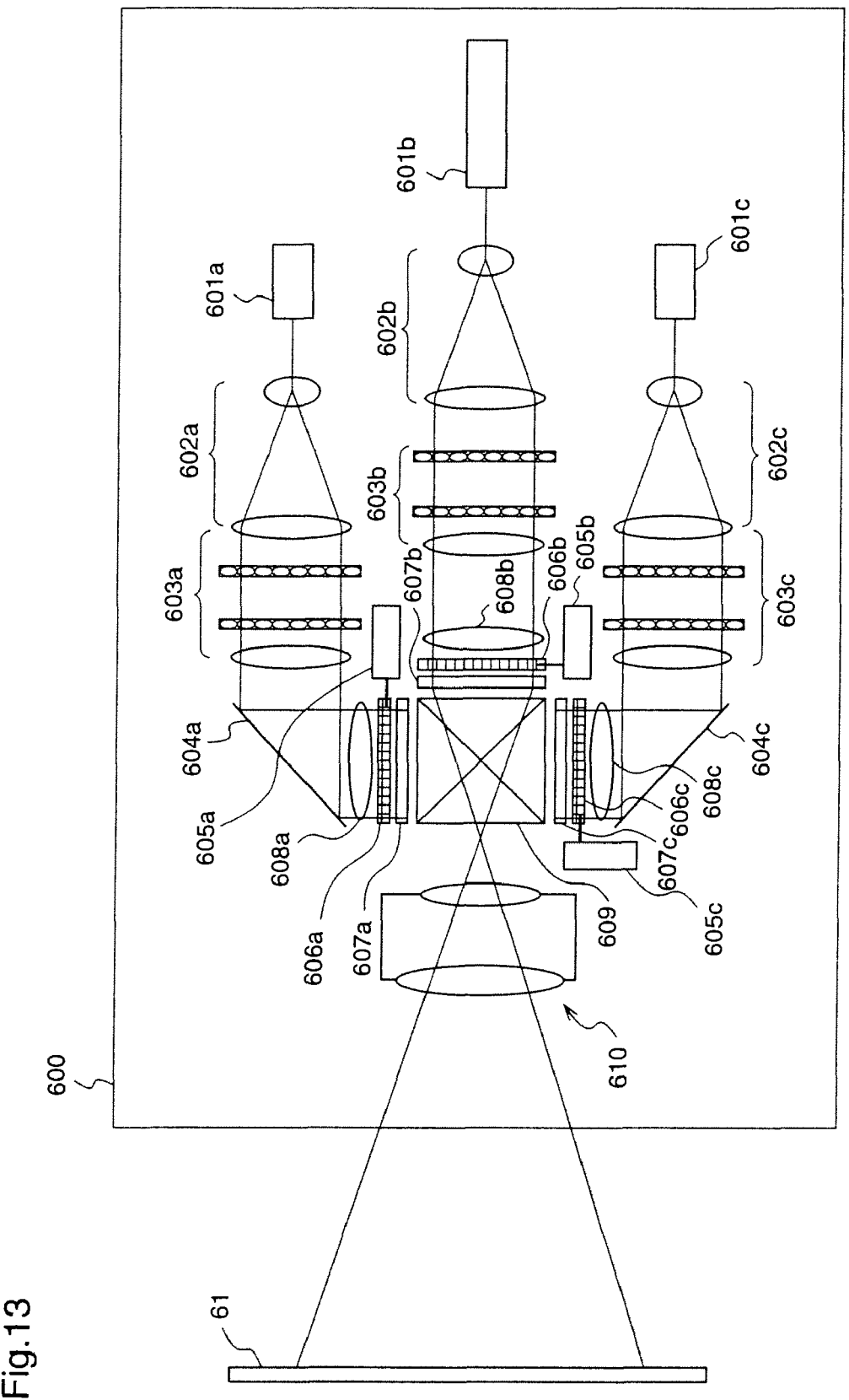
FIG. 13 is a diagram illustrating an example of a conventional two-dimensional image display device.
Figure 14:
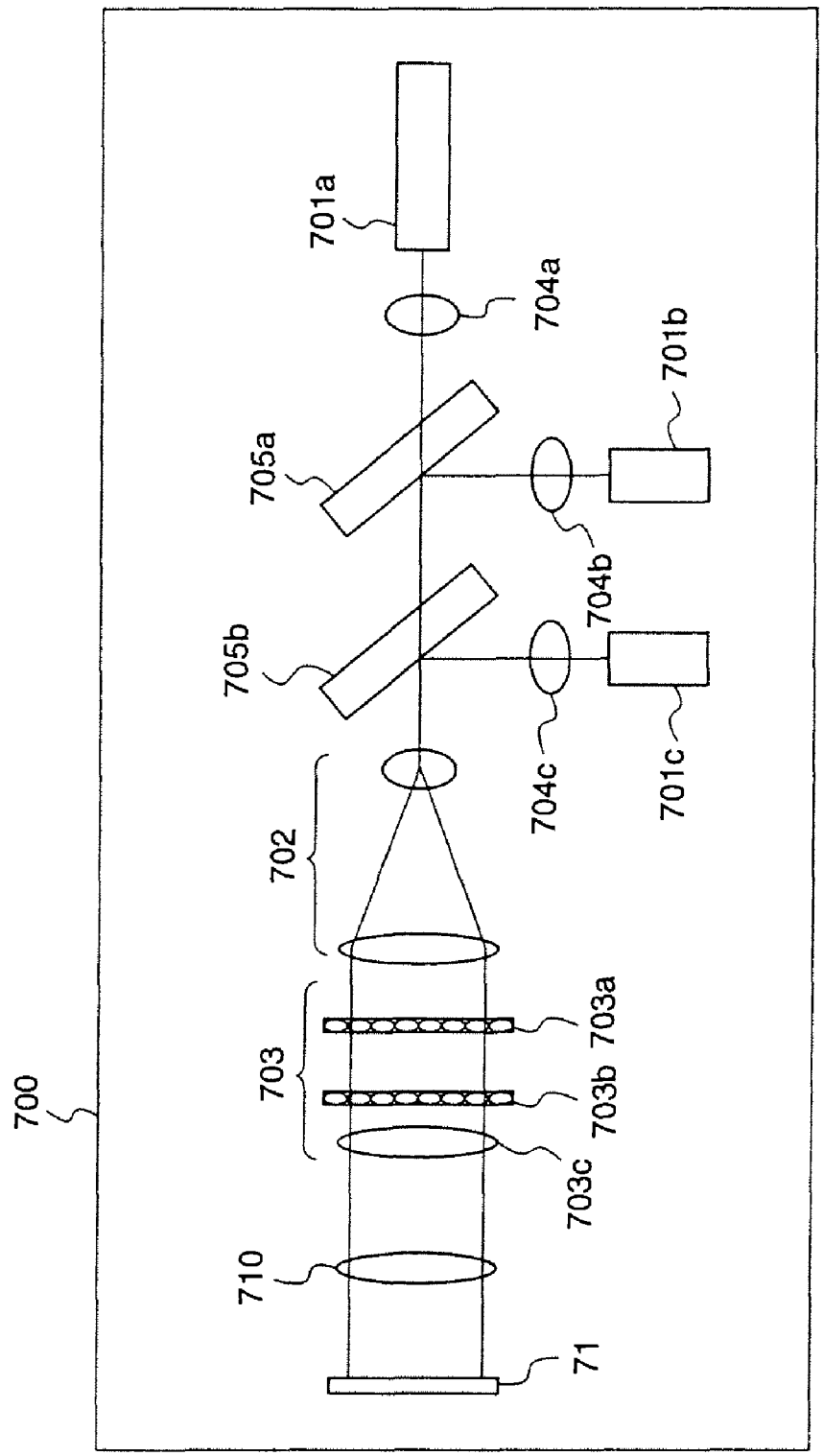
FIG. 14 is a diagram illustrating another example of a conventional two-dimensional image display device.

FIG. 12 is a diagram illustrating the construction of the two-dimensional image display device according to the fourth embodiment.

With reference to FIG. 12, reference numeral 500 denotes a two-dimensional image display device according to the fourth embodiment, and this two-dimensional image display device 500 comprises a light source device 300 including laser light sources 11a, 11b, and 11c corresponding to red light, blue light, and green light; laser driving units 550a~550c for red light, blue light, and green light, which drive the respective laser light sources in the light source device 300; a laser switching unit 540 for selecting one of the respective laser driving units 550a~550c; a video signal switching unit 530 for selecting any of a red video signal, a blue video signal, and a green video signal which are supplied from the outside, and outputting the selected video signal to a spatial light modulation element 30; a control unit 520 for outputting a control signal to successively display the R, G, and B images, thereby controlling the laser switching unit 540 and the video signal switching unit 530; a field lens 560 for converting the respective laser lights emitted from the light source device 300 into a condensed light flux near to a parallel light flux; and a projection lens 510 for receiving the emitted light from the spatial light modulation element 30, and projecting it onto a screen 51. The light source device 300 is identical to that of the third embodiment.

Next, a description will be given of the operation of the two-dimensional image display device 500 constructed as mentioned above.

Initially, the video signal switching unit 530 successively selects the inputted red video signal, blue video signal, and green video signal according to the control signal supplied from the control unit 520, and outputs the signals to the spatial light modulation element 30.

Further, the laser switching unit 540 drives the red light, blue light, and green light laser driving units 550a~550c according to the control signal from the control unit 520 to successively activate the red color, blue color, and green color laser light sources 11a~11c.

Thereby, light emissions in the respective color laser sources and formations of images of the respective colors by the spatial light modulation element 30 are synchronously carried out. To be specific, in the state where the red light laser source 11a emits light, the red video signal is supplied to the spatial light modulation element 30 and thereby modulation of the red light is carried out. In the state where the blue light laser source 11b emits light, the blue video signal is supplied to the spatial light modulation element 30 and thereby modulation of the blue light is carried out. In the state where the green light laser source 11c emits light, the green video signal is supplied to the spatial light modulation element 30 and thereby modulation of the green light is carried out.

Then, the images formed by the modulations of the respective color lights by the spatial light modulation element 30 are projected on the screen 51 by the projection lens 510.

When displaying a moving picture, it is necessary to display many frames of pictures in a short time, for example, 30 frames of pictures per sec. In order to realize such display in the device 500, the control unit 520 controls the light sources 11a~11c so that each of these light sources emits light several times during picture display of one frame of a picture that is displayed at 30 frames per sec, whereby the pictures of the respective colors are inseparable when observed with human eyes, and therefore, the user can observe a full-color natural moving picture.

As described above, according to the fourth embodiment, the light source device of the two-dimensional image display device 500 comprises the three laser light sources 11a~11c, and the diffraction part 320 comprising a volume hologram, for multiplexing the lights emitted from the laser light sources 11a~11c so that these lights become coaxial beams. Therefore, the optical system for converting the emitted lights from the three laser light sources into coaxial beams can be miniaturized, whereby the two-dimensional image display device can be miniaturized.

Further, according to the fourth embodiment, since the light source device 300 also functions as a light integrator, the intensity distribution of light outputted from the light source device can be made uniform without using a light integrator comprising a fly-eye lens which is conventionally needed for making the light intensity distribution uniform. Therefore, the two-dimensional image display device in which the intensity distributions of the lights emitted from the light sources can be further miniaturized, and further, the number of constituents of the two-dimensional image display device can be reduced, thereby realizing a two-dimensional image display device that is easy to assemble and is reduced in cost.

The invention claimed is:

1. A light source device comprising:
at least two coherent light sources; and
a diffraction part for diffracting lights emitted from the coherent light sources, such that the lights propagate through the same optical path,
wherein the lights have different incident angles upon contacting the diffraction part, and the diffraction part is for receiving the lights having different incident angles and outputting a coaxial beam comprising said lights,
wherein said diffraction part comprises:
a first diffraction element for receiving at least two lights, and diffracting at least one of the received lights so that the received at least two lights propagate through the same optical path; and
a second diffraction element for diffracting the light emitted from at least one coherent light source among the at least two coherent light sources so that the center axes of the optical propagation paths of the lights emitted from the respective coherent light sources intersect at one point on the first diffraction element,
and wherein said second diffraction element is further provided with a lens function, and said second diffraction element condenses the respective lights emitted from the at least two coherent light sources so that the respective lights diffracted by the second diffraction element irradiate the same region of the first diffraction element.

2. A light source device as defined in claim 1 wherein
said first diffraction element is regionally divided, and
the respective lights that are diffracted in the divided regions of the first diffraction element irradiate the same planar region.

3. A light source device as defined in claim 1 wherein said diffraction element is regionally divided in a lattice pattern.

4. A light source device comprising:
at least two coherent light sources; and
a diffraction part for diffracting lights emitted from the coherent light sources,
wherein the lights have different incident angles upon contacting the diffraction part, and the diffraction part is for receiving the lights having different incident angles and diffracting the lights such that the lights propagate through the same optical path;
wherein said diffraction part comprises a single diffraction element, and
said diffraction part is divided into plural regions, and each region diffracts lights which are incident to each divided region, such that a divergence angle of the incident light is expanded, and
light emitted from one of the divided region of the diffraction part and light from emitted the other divided region of the diffraction part are overlapping and irradiate the same planar region.

5. A light source device as defined in claim 4 wherein
said diffraction element is a volume hologram, and
plural gratings are multiplexed on the volume hologram, which gratings receive the respective lights emitted from the at least two coherent light sources, and change the propagation directions of the respective lights.

6. A two-dimensional image display device comprising:
at least two coherent light sources;
a diffraction part for diffracting light emitted from at least one coherent light source so that the respective lights emitted from the at least two coherent light sources propagate in the same optical path; and
a two-dimensional spatial light modulation element for receiving the respective lights that are diffracted by the diffraction part to be coaxial beams, said element being provided in a space above the diffraction part.

7. A two-dimensional image display device comprising:
at least two coherent light sources; and
a diffraction part for diffracting lights emitted from the coherent light sources, such that the lights propagate through the same optical path,
wherein the lights have different incident angles upon contacting the diffraction part, and the diffraction part is for receiving the lights having different incident angles and outputting a coaxial beam comprising said lights,
wherein said diffraction part comprises:
a first diffraction element for receiving at least two lights, and diffracting at least one of the received lights so that the received at least two lights propagate through the same optical path;
a second diffraction element for diffracting the light emitted from at least one coherent light source among the at least two coherent light sources so that the center axes of the optical propagation paths of the lights emitted from the respective coherent light sources intersect at one point on the first diffraction element,
wherein said diffraction element is further provided with a lens function, and said second diffraction element condenses the respective lights emitted from the at least two coherent light sources so that the respective lights diffracted by the second diffraction element irradiate the same region of the first diffraction element; and
a two-dimensional spatial light modulation element for receiving the respective lights that are diffracted by the diffraction part into coaxial beams, said element being provided in a space above the diffraction part.

8. A two-dimensional image display device comprising:
at least two coherent light sources; and
a diffraction part for diffracting lights emitted from the coherent light sources,
wherein the lights have different incident angles upon contacting the diffraction part, and the diffraction part is for receiving the lights having different incident angles and diffracting the lights such that the lights propagate through the same optical path;
wherein said diffraction part comprises a single diffraction element, and
said diffraction part is divided into plural regions, and each divided region diffracts lights which are incident to each divided region, such that a divergence angle of the incident light is expanded,
light emitted from one of the divided region of the diffraction part and light emitted from the other divided region of the diffraction part are overlapping and irradiate the same planar region, and
a two-dimensional spatial light modulation element for receiving the respective lights that are diffracted by the diffraction part into coaxial beams, said element being provided in a space above the diffraction part.

* * * * *